(12) United States Patent
Hazani et al.

(10) Patent No.: US 8,325,693 B2
(45) Date of Patent: Dec. 4, 2012

(54) SYSTEM AND METHOD FOR CARRYING A WIRELESS BASED SIGNAL OVER WIRING

(75) Inventors: Ami Hazani, Ra'anana (IL); Shlomo Butbul, Ra'anana (IL); Yehuda Binder, Hod Hasharon (IL)

(73) Assignee: Corning MobileAccess Ltd, Airport (IL)

( * ) Notice: Subject to any disclaimer, the term of this patent is extended or adjusted under 35 U.S.C. 154(b) by 105 days.

(21) Appl. No.: 12/944,964

(22) Filed: Nov. 12, 2010

(65) Prior Publication Data
US 2011/0281530 A1 Nov. 17, 2011

Related U.S. Application Data

(63) Continuation of application No. 12/129,278, filed on May 29, 2008, which is a continuation of application No. 11/066,442, filed on Feb. 28, 2005, now abandoned.

(51) Int. Cl.
| | |
|---|---|
| H04W 4/00 | (2009.01) |
| H04L 12/28 | (2006.01) |
| H04J 3/16 | (2006.01) |
| H04B 1/38 | (2006.01) |

(52) U.S. Cl. ........ 370/338; 370/351; 370/466; 375/222; 455/130

(58) Field of Classification Search .................. 370/332, 370/338, 351, 352, 464–466; 340/310.01; 375/130, 219, 222; 379/90.01; 439/43, 44, 439/129, 577, 578; 455/130, 131
See application file for complete search history.

(56) References Cited

U.S. PATENT DOCUMENTS

| | | | |
|---|---|---|---|
| 2,092,709 | A | 9/1937 | Wheeler |
| 2,298,435 | A | 10/1942 | Tunick |
| 2,411,786 | A | 11/1946 | Halstead |
| 2,613,285 | A | 10/1952 | Fromm |
| 2,671,850 | A | 3/1954 | Marcou |
| 2,747,083 | A | 5/1956 | Guanella |
| 2,964,623 | A | 12/1960 | Bell |
| 2,986,723 | A | 5/1961 | Darwin et al. |
| 3,072,899 | A | 1/1963 | Kleist et al. |

(Continued)

FOREIGN PATENT DOCUMENTS
CN 1430848 A 7/2003
(Continued)

OTHER PUBLICATIONS

European Search Report issued Apr. 6, 2011 for European Patent Application No. 10182929.9, 7 pages.

(Continued)

*Primary Examiner* — Ricky Ngo
*Assistant Examiner* — Paul H Masur
(74) *Attorney, Agent, or Firm* — C. Keith Montgomery

(57) ABSTRACT

A device, network and method wherein a standard wireless modem is coupled to wiring for carrying a wireless baseband signal that may be OFDM based, and may be directly generated by the wireless IF modem, or extracted from the modem RF signal. The wiring may be a building utility wiring, such as telephone, AC power or CATV wiring. The baseband signal is carried simultaneously with the utility service signal over the utility wiring using Frequency Division Multiplexing. The device may be enclosed with a data unit, a standalone dedicated enclosure, within an outlet or as a plug-in outlet adapter. Data units may couple the device by a wiring port such as standard data connector, or via wireless connection. The device may be locally powered or via a power signal carried over the wiring. This abstract is not intended to limit or construe the scope of the claims.

22 Claims, 20 Drawing Sheets

U.S. PATENT DOCUMENTS

| | | |
|---|---|---|
| 3,274,339 A | 9/1966 | Herry et al. |
| 3,656,112 A | 4/1972 | Paull |
| 3,699,250 A | 10/1972 | Bunting |
| 4,013,840 A | 3/1977 | Anderson |
| 4,049,914 A | 9/1977 | Anderson et al. |
| 4,063,173 A | 12/1977 | Nelson et al. |
| 4,186,347 A | 1/1980 | Brockman et al. |
| 4,199,761 A | 4/1980 | Whyte et al. |
| 4,200,862 A | 4/1980 | Campbell et al. |
| 4,205,270 A | 5/1980 | Okatani et al. |
| 4,417,279 A | 11/1983 | Shinkawa et al. |
| 4,449,246 A | 5/1984 | Seiler et al. |
| 4,456,925 A | 6/1984 | Skerlos et al. |
| 4,462,113 A | 7/1984 | Iwata |
| 4,467,140 A | 8/1984 | Fathauer et al. |
| 4,468,538 A | 8/1984 | Cripps |
| 4,476,574 A | 10/1984 | Struven |
| 4,500,976 A | 2/1985 | DuBroff |
| 4,509,211 A | 4/1985 | Robbins |
| 4,528,519 A | 7/1985 | van Driest |
| 4,556,988 A | 12/1985 | Yoshisato |
| 4,706,274 A | 11/1987 | Baker et al. |
| 4,718,108 A | 1/1988 | Davidson et al. |
| 4,746,809 A | 5/1988 | Coleman et al. |
| 4,777,652 A | 10/1988 | Stolarczyk |
| 4,850,009 A | 7/1989 | Zook et al. |
| 4,856,085 A | 8/1989 | Horvat |
| 4,864,588 A | 9/1989 | Simpson et al. |
| 4,866,757 A | 9/1989 | Nilssen |
| 4,885,803 A | 12/1989 | Hermann et al. |
| 4,901,368 A | 2/1990 | Arnold et al. |
| 4,916,460 A | 4/1990 | Powell |
| 4,918,690 A | 4/1990 | Markkula, Jr. et al. |
| 4,941,200 A | 7/1990 | Leslie et al. |
| 4,941,207 A | 7/1990 | Maeda et al. |
| 4,959,862 A | 9/1990 | Davidov et al. |
| 4,972,505 A | 11/1990 | Isberg |
| 4,980,665 A | 12/1990 | Schotz |
| 4,999,613 A | 3/1991 | Williamson et al. |
| 5,045,948 A | 9/1991 | Streck et al. |
| 5,046,135 A | 9/1991 | Hatcher |
| 5,109,222 A | 4/1992 | Welty et al. |
| 5,109,532 A | 4/1992 | Petrovic et al. |
| 5,115,463 A | 5/1992 | Moldavsky et al. |
| 5,142,397 A | 8/1992 | Dockery |
| 5,161,021 A | 11/1992 | Tsai |
| 5,187,803 A | 2/1993 | Sohner et al. |
| 5,187,806 A | 2/1993 | Johnson et al. |
| 5,210,788 A | 5/1993 | Nilssen |
| 5,230,086 A | 7/1993 | Saul |
| 5,247,347 A | 9/1993 | Litteral et al. |
| 5,251,053 A | 10/1993 | Heidemann |
| 5,255,268 A | 10/1993 | Cato et al. |
| 5,265,150 A | 11/1993 | Helmkamp et al. |
| 5,297,203 A | 3/1994 | Rose et al. |
| 5,321,736 A | 6/1994 | Beasley |
| 5,321,846 A | 6/1994 | Yokota et al. |
| 5,339,184 A | 8/1994 | Tang |
| 5,361,407 A | 11/1994 | Sawada et al. |
| 5,404,570 A | 4/1995 | Charas et al. |
| 5,428,836 A | 6/1995 | Sanecki et al. |
| 5,432,838 A | 7/1995 | Purchase et al. |
| 5,457,557 A | 10/1995 | Zarem et al. |
| 5,469,495 A | 11/1995 | Beveridge |
| 5,481,249 A | 1/1996 | Sato |
| 5,489,894 A | 2/1996 | Murray |
| 5,502,446 A | 3/1996 | Denninger |
| 5,537,637 A | 7/1996 | Sugita et al. |
| 5,539,821 A | 7/1996 | Blonder |
| 5,550,898 A | 8/1996 | Abbasi et al. |
| 5,551,057 A | 8/1996 | Mitra |
| 5,565,855 A | 10/1996 | Knibbe |
| 5,572,575 A | 11/1996 | Yamamoto et al. |
| 5,574,964 A | 11/1996 | Hamlin |
| 5,579,221 A | 11/1996 | Mun |
| 5,600,333 A | 2/1997 | Justice et al. |
| 5,603,080 A | 2/1997 | Kallander et al. |
| 5,619,251 A | 4/1997 | Kuroiwa et al. |
| 5,619,505 A | 4/1997 | Grube et al. |
| 5,628,055 A | 5/1997 | Stein |
| 5,634,191 A | 5/1997 | Beasley |
| 5,657,358 A | 8/1997 | Panech et al. |
| 5,694,232 A | 12/1997 | Parsay et al. |
| 5,696,861 A | 12/1997 | Schimmeyer et al. |
| 5,708,705 A | 1/1998 | Yamashita et al. |
| 5,708,961 A | 1/1998 | Hylton et al. |
| 5,734,678 A | 3/1998 | Paneth et al. |
| 5,736,965 A | 4/1998 | Mosebrook et al. |
| 5,748,104 A | 5/1998 | Argyroudis et al. |
| 5,758,294 A | 5/1998 | Ganesan et al. |
| 5,765,099 A | 6/1998 | Georges et al. |
| 5,774,789 A | 6/1998 | van der Kaay et al. |
| 5,809,395 A | 9/1998 | Hamilton-Piercy et al. |
| 5,812,184 A | 9/1998 | Martinez |
| 5,812,786 A | 9/1998 | Seazholtz et al. |
| 5,815,086 A | 9/1998 | Ivie et al. |
| 5,822,678 A | 10/1998 | Evanyk |
| 5,828,663 A | 10/1998 | Ikegami |
| 5,832,364 A | 11/1998 | Gustafson |
| 5,832,365 A | 11/1998 | Chen et al. |
| 5,835,863 A | 11/1998 | Ikenouchi et al. |
| 5,838,226 A | 11/1998 | Houggy et al. |
| 5,864,284 A | 1/1999 | Sanderson |
| 5,896,569 A | 4/1999 | Butler et al. |
| 5,901,340 A | 5/1999 | Flickinger et al. |
| 5,905,442 A | 5/1999 | Mosebrook et al. |
| 5,910,776 A | 6/1999 | Black |
| 5,926,531 A | 7/1999 | Petite |
| 5,929,896 A | 7/1999 | Goodman et al. |
| 5,930,682 A | 7/1999 | Schwartz et al. |
| 5,930,719 A | 7/1999 | Babitch et al. |
| 5,936,660 A | 8/1999 | Gurantz |
| 5,937,342 A | 8/1999 | Kline |
| 5,937,348 A | 8/1999 | Cina et al. |
| 5,940,400 A | 8/1999 | Eastmond et al. |
| 5,950,149 A | 9/1999 | Fieramosca et al. |
| 5,953,670 A | 9/1999 | Newson |
| 5,977,913 A | 11/1999 | Christ |
| 5,982,363 A | 11/1999 | Naiff |
| 5,982,854 A | 11/1999 | Ehreth |
| 5,983,070 A | 11/1999 | Georges et al. |
| 5,986,574 A | 11/1999 | Colton |
| 5,987,303 A | 11/1999 | Dutta et al. |
| 5,994,998 A | 11/1999 | Fisher et al. |
| 5,995,593 A | 11/1999 | Cho |
| 6,005,884 A | 12/1999 | Cook et al. |
| 6,014,546 A | 1/2000 | Georges et al. |
| 6,032,057 A | 2/2000 | Kiiski |
| 6,040,759 A | 3/2000 | Sanderson |
| 6,049,705 A | 4/2000 | Xue |
| 6,069,588 A | 5/2000 | O'Neill, Jr. |
| 6,069,899 A | 5/2000 | Foley |
| 6,101,341 A | 8/2000 | Manabe |
| 6,108,331 A | 8/2000 | Thompson |
| 6,128,470 A | 10/2000 | Naidu et al. |
| 6,130,896 A | 10/2000 | Lueker et al. |
| 6,151,480 A | 11/2000 | Fischer et al. |
| 6,157,810 A | 12/2000 | Georges et al. |
| 6,175,860 B1 | 1/2001 | Gaucher |
| 6,198,432 B1 | 3/2001 | Janky |
| 6,218,931 B1 | 4/2001 | Asghar et al. |
| 6,243,413 B1 | 6/2001 | Beukema |
| 6,249,671 B1 | 6/2001 | Tucker et al. |
| 6,256,296 B1 | 7/2001 | Ruziak et al. |
| 6,317,884 B1 | 11/2001 | Eames et al. |
| 6,330,244 B1 | 12/2001 | Swartz et al. |
| 6,346,875 B1 | 2/2002 | Puckette et al. |
| 6,353,599 B1 | 3/2002 | Bi et al. |
| 6,392,349 B1 | 5/2002 | Crenshaw |
| 6,400,815 B1 | 6/2002 | Gilboy et al. |
| 6,400,957 B1 | 6/2002 | Rodrigues et al. |
| 6,438,109 B1 | 8/2002 | Karaoguz et al. |
| 6,452,910 B1 | 9/2002 | Vij et al. |
| 6,452,923 B1 | 9/2002 | Gerszberg et al. |
| 6,483,470 B1 | 11/2002 | Hohnstein et al. |
| 6,492,897 B1 | 12/2002 | Mowery, Jr. |
| 6,493,875 B1 | 12/2002 | Eames et al. |

| | | | | | | |
|---|---|---|---|---|---|---|
| 6,501,942 B1 | 12/2002 | Weissman et al. | 7,167,525 B2 | 1/2007 | Santhoff et al. |
| 6,513,163 B1 | 1/2003 | Silvia et al. | 7,167,923 B2 | 1/2007 | Lo |
| 6,535,110 B1 | 3/2003 | Arora et al. | 7,181,023 B1 | 2/2007 | Andrews et al. |
| 6,546,098 B1 | 4/2003 | Henderson | 7,194,251 B2 | 3/2007 | Rubinstein et al. |
| 6,563,418 B1 | 5/2003 | Moon | 7,209,719 B2 | 4/2007 | Liebenow |
| 6,572,384 B1 | 6/2003 | Marchevsky | 7,209,945 B2 | 4/2007 | Hicks, III et al. |
| 6,573,826 B2 | 6/2003 | Pan | 7,257,106 B2 | 8/2007 | Chen et al. |
| 6,577,231 B2 | 6/2003 | Litwin, Jr. et al. | 7,257,108 B2 | 8/2007 | Cheston et al. |
| 6,580,728 B1 | 6/2003 | Cook et al. | 7,266,344 B2 | 9/2007 | Rodriguez |
| 6,583,719 B2 | 6/2003 | Okada et al. | 7,292,859 B2 | 11/2007 | Park |
| 6,587,739 B1 | 7/2003 | Abrams et al. | 7,299,287 B1 | 11/2007 | Rubinstein et al. |
| 6,618,578 B1 | 9/2003 | Petite | 7,317,793 B2 | 1/2008 | Binder et al. |
| 6,622,304 B1 | 9/2003 | Carhart | 7,321,316 B2 | 1/2008 | Hancock et al. |
| 6,650,871 B1 | 11/2003 | Cannon et al. | 7,359,449 B2 | 4/2008 | Feher |
| 6,654,616 B1 | 11/2003 | Pope, Jr. et al. | 7,508,785 B2 | 3/2009 | Dale et al. |
| 6,668,328 B1 | 12/2003 | Bell | 7,813,451 B2 | 10/2010 | Binder et al. |
| 6,683,531 B2 | 1/2004 | Diamanti et al. | 2002/0034220 A1 | 3/2002 | Duxbury |
| 6,710,721 B1 | 3/2004 | Holowick | 2002/0035624 A1 | 3/2002 | Kim |
| 6,725,059 B1 | 4/2004 | Bell | 2002/0037004 A1 | 3/2002 | Bossemeyer et al. |
| 6,731,945 B2 | 5/2004 | Do et al. | 2002/0038459 A1 | 3/2002 | Talmola et al. |
| 6,737,984 B1 | 5/2004 | Welles, II et al. | 2002/0049036 A1 | 4/2002 | Bullock et al. |
| 6,738,641 B1 | 5/2004 | Elsasser | 2002/0061012 A1 | 5/2002 | Thi et al. |
| 6,748,080 B2 | 6/2004 | Russ et al. | 2002/0075806 A1 | 6/2002 | Shalvi et al. |
| 6,751,441 B1 | 6/2004 | Murray et al. | 2002/0146207 A1 | 10/2002 | Chu |
| 6,759,946 B2 | 7/2004 | Sahinoglu et al. | 2002/0186836 A1 | 12/2002 | Leuca et al. |
| 6,760,601 B1 | 7/2004 | Suoknuuti et al. | 2003/0006881 A1 | 1/2003 | Reyes |
| 6,771,164 B1 | 8/2004 | Fink | 2003/0018975 A1 | 1/2003 | Stone |
| 6,781,530 B2 | 8/2004 | Moore | 2003/0031191 A1 | 2/2003 | El Wardani et al. |
| 6,782,048 B2 | 8/2004 | Santhoff | 2003/0067910 A1 | 4/2003 | Razazian et al. |
| 6,807,463 B1 | 10/2004 | Cunningham et al. | 2003/0068033 A1 | 4/2003 | Kiko |
| 6,826,174 B1 | 11/2004 | Erekson et al. | 2003/0099228 A1 | 5/2003 | Alcock |
| 6,831,921 B2 | 12/2004 | Higgins | 2003/0100288 A1 | 5/2003 | Tomlinson, Jr. et al. |
| 6,842,459 B1 | 1/2005 | Binder | 2003/0100330 A1 | 5/2003 | Tomlinson, Jr. et al. |
| 6,844,809 B2 | 1/2005 | Manis et al. | 2003/0106067 A1 | 6/2003 | Hoskins et al. |
| 6,857,132 B1 | 2/2005 | Rakib et al. | 2003/0169752 A1 | 9/2003 | Chen et al. |
| 6,862,349 B1 | 3/2005 | Beveridge | 2004/0032373 A1 | 2/2004 | Petros et al. |
| 6,862,353 B2 | 3/2005 | Rabenko et al. | 2004/0073597 A1 | 4/2004 | Caveney et al. |
| 6,885,674 B2 | 4/2005 | Hunt et al. | 2004/0077310 A1 | 4/2004 | Levy |
| 6,895,249 B2 | 5/2005 | Gaal | 2004/0085976 A1 | 5/2004 | Dale et al. |
| 6,901,439 B1 | 5/2005 | Bonasia et al. | 2004/0100930 A1 | 5/2004 | Shapira et al. |
| 6,914,539 B2 | 7/2005 | Hoctor et al. | 2004/0102196 A1 | 5/2004 | Weckstrom et al. |
| 6,931,659 B1 | 8/2005 | Kinemura | 2004/0123322 A1 | 6/2004 | Erkocevic et al. |
| 6,933,835 B2 | 8/2005 | Kline | 2004/0125870 A1 | 7/2004 | Yamazaki |
| 6,941,576 B2 | 9/2005 | Amit | 2004/0131357 A1 | 7/2004 | Farmer et al. |
| 6,950,567 B2 | 9/2005 | Kline | 2004/0136388 A1 | 7/2004 | Schaff |
| 6,961,763 B1 | 11/2005 | Wang et al. | 2004/0151305 A1 | 8/2004 | Binder et al. |
| 6,963,936 B2 | 11/2005 | Billington et al. | 2004/0158649 A1 | 8/2004 | Ophir et al. |
| 6,965,302 B2 | 11/2005 | Mollenkopf et al. | 2004/0187156 A1 | 9/2004 | Palm et al. |
| 6,980,089 B1 | 12/2005 | Kline | 2004/0201457 A1 | 10/2004 | O'Toole et al. |
| 6,985,072 B2 | 1/2006 | Omidi et al. | 2004/0203387 A1 | 10/2004 | Grannan |
| 6,985,714 B2 | 1/2006 | Akiyama et al. | 2004/0208167 A1 | 10/2004 | Kishida |
| 6,987,988 B2 | 1/2006 | Uchiyama | 2004/0208599 A1 | 10/2004 | Swartz et al. |
| 6,993,317 B2 | 1/2006 | Belsak, Jr. | 2004/0213351 A1 | 10/2004 | Shattil |
| 6,995,657 B2 | 2/2006 | Zalitzky et al. | 2004/0235468 A1 | 11/2004 | Luebke et al. |
| 6,996,837 B1 | 2/2006 | Miura et al. | 2004/0248531 A1 | 12/2004 | Takaki |
| 7,003,102 B2 | 2/2006 | Kiko | 2004/0255332 A1 | 12/2004 | Bertonis et al. |
| 7,006,006 B2 | 2/2006 | Witkow et al. | 2005/0010954 A1 | 1/2005 | Binder |
| 7,009,527 B2 | 3/2006 | Seo | 2005/0024945 A1 | 2/2005 | Forbes |
| 7,009,946 B1 | 3/2006 | Kardach | 2005/0034159 A1 | 2/2005 | Ophir et al. |
| 7,015,797 B2 | 3/2006 | Kaylor et al. | 2005/0073968 A1 | 4/2005 | Perlman |
| 7,023,382 B1 | 4/2006 | Akano | 2005/0084004 A1 | 4/2005 | Bione |
| 7,027,416 B1 | 4/2006 | Kriz | 2005/0089061 A1 | 4/2005 | Logvinov et al. |
| 7,027,483 B2 | 4/2006 | Santhoff et al. | 2005/0114325 A1 | 5/2005 | Liu et al. |
| 7,027,770 B2 | 4/2006 | Judd et al. | 2005/0117545 A1 | 6/2005 | Wittwer et al. |
| 7,035,270 B2 | 4/2006 | Moore, Jr. et al. | 2005/0136972 A1 | 6/2005 | Smith et al. |
| 7,046,716 B1 | 5/2006 | Miao | 2005/0144647 A1 | 6/2005 | Zussman et al. |
| 7,064,654 B2 | 6/2006 | Berkman et al. | 2005/0152337 A1 | 7/2005 | Wurtzel et al. |
| 7,088,238 B2 | 8/2006 | Karaoguz et al. | 2005/0164666 A1 | 7/2005 | Lang et al. |
| 7,099,621 B1 | 8/2006 | Chadwick | 2005/0180561 A1 | 8/2005 | Hazani et al. |
| 7,103,240 B2 | 9/2006 | Kline | 2005/0181839 A1 | 8/2005 | Tiainen et al. |
| 7,113,134 B1 | 9/2006 | Berkman | 2005/0184915 A1 | 8/2005 | Nagel et al. |
| 7,117,763 B2 | 9/2006 | Heinonen et al. | 2005/0226200 A1 | 10/2005 | Askildsen et al. |
| 7,117,520 B2 | 10/2006 | Stewart | 2005/0226206 A1 | 10/2005 | An |
| 7,123,939 B1 | 10/2006 | Bird et al. | 2005/0239400 A1 | 10/2005 | Narikawa |
| 7,133,729 B1 | 11/2006 | Wang et al. | 2005/0265428 A1 | 12/2005 | McCorkle |
| 7,151,575 B1 | 12/2006 | Landry et al. | 2005/0265430 A1 | 12/2005 | Ozluturk et al. |
| 7,155,214 B2 | 12/2006 | Struthers et al. | 2005/0268322 A1 | 12/2005 | Watson |
| 7,164,886 B2 | 1/2007 | Mowery et al. | 2005/0280598 A1 | 12/2005 | Webb et al. |
| 7,167,078 B2 | 1/2007 | Pourchot | 2006/0007945 A1 | 1/2006 | Schoettle et al. |

| | | | |
|---|---|---|---|
| 2006/0018328 | A1 | 1/2006 | Mody et al. |
| 2006/0056283 | A1 | 3/2006 | Anikhindi et al. |
| 2006/0066455 | A1 | 3/2006 | Hancock et al. |
| 2006/0072684 | A1 | 4/2006 | Feher |
| 2006/0126617 | A1 | 6/2006 | Cregg et al. |
| 2006/0128425 | A1 | 6/2006 | Rooyen |
| 2006/0133465 | A1 | 6/2006 | Dockemeyer, Jr. et al. |
| 2006/0152344 | A1 | 7/2006 | Mowery, Jr. |
| 2006/0172781 | A1 | 8/2006 | Mohebbi |
| 2006/0210278 | A1 | 9/2006 | Cregg et al. |
| 2006/0220833 | A1 | 10/2006 | Berkman |
| 2006/0222086 | A1 | 10/2006 | Frye, Jr. |
| 2006/0251086 | A1 | 11/2006 | Ha et al. |
| 2006/0262014 | A1 | 11/2006 | Shemesh et al. |
| 2006/0274745 | A1 | 12/2006 | Wang et al. |
| 2006/0276227 | A1 | 12/2006 | Dravida |
| 2006/0286958 | A1 | 12/2006 | Lee et al. |
| 2007/0002772 | A1 | 1/2007 | Berkman et al. |
| 2007/0002876 | A1 | 1/2007 | Berkman et al. |
| 2007/0019959 | A1 | 1/2007 | Retnasothie et al. |
| 2007/0025368 | A1 | 2/2007 | Ha et al. |
| 2007/0047573 | A1 | 3/2007 | Logvinov et al. |
| 2007/0054622 | A1 | 3/2007 | Berkman |
| 2007/0058666 | A1 | 3/2007 | Pratt |
| 2007/0082649 | A1 | 4/2007 | Chan |
| 2007/0083668 | A1 | 4/2007 | Kelsey et al. |
| 2007/0104168 | A1 | 5/2007 | Polson |
| 2007/0112939 | A1 | 5/2007 | Wilson et al. |
| 2007/0139188 | A1 | 6/2007 | Ollis et al. |
| 2007/0167144 | A1 | 7/2007 | Koga et al. |
| 2007/0177495 | A1 | 8/2007 | Ametsitsi |
| 2007/0198748 | A1 | 8/2007 | Ametsitsi et al. |
| 2007/0206629 | A1 | 9/2007 | Choi |
| 2007/0254714 | A1 | 11/2007 | Martich et al. |
| 2007/0264009 | A1 | 11/2007 | Sabat, Jr. et al. |
| 2007/0268846 | A1 | 11/2007 | Proctor et al. |
| 2007/0268886 | A1 | 11/2007 | Caspi et al. |
| 2008/0144493 | A1 | 6/2008 | Yeh |
| 2008/0280569 | A1 | 11/2008 | Hazani et al. |

FOREIGN PATENT DOCUMENTS

| | | |
|---|---|---|
| DE | 20317501 U1 | 1/2004 |
| EP | 0342858 A2 | 11/1989 |
| EP | 0355328 A2 | 2/1990 |
| EP | 0709974 A1 | 5/1996 |
| EP | 0938204 A1 | 8/1999 |
| EP | 1085684 A2 | 3/2001 |
| EP | 1331762 A1 | 7/2003 |
| EP | 1749399 A1 | 2/2007 |
| GB | 2266028 A | 10/1993 |
| GB | 2313020 A | 11/1997 |
| JP | 5252559 A | 9/1993 |
| JP | 5327569 A | 12/1993 |
| JP | 5327576 A | 12/1993 |
| WO | 9413067 A1 | 6/1994 |
| WO | 9613102 A1 | 5/1996 |
| WO | 9804054 A1 | 1/1998 |
| WO | 0180543 A2 | 10/2001 |
| WO | 02065229 A2 | 8/2002 |
| WO | 02091618 A1 | 11/2002 |
| WO | 2004068827 A1 | 8/2004 |
| WO | 2004107783 A1 | 12/2004 |
| WO | 2005109845 A1 | 11/2005 |
| WO | 2006052216 A1 | 5/2006 |
| WO | 2006105185 A2 | 10/2006 |
| WO | 2006136811 A1 | 12/2006 |
| WO | 2007069241 A2 | 6/2007 |
| WO | 2007133630 A2 | 11/2007 |

OTHER PUBLICATIONS

European Search Report issued Apr. 5, 2011 for European Patent Application No. 10182930.7, 6 pages.
Agere Systems, "WaveLAN™ WL60040 Multimode Wireless LAN Media Access Controller (MAC)", Aug. 2003, pp. 1-10.
Agere Systems, Inc. "WaveLAN™ 802.11a/b/g Chip Set", document from Agere Systems, Feb. 2003, PA, USA, pp. 1-6.
Agere Systems, Inc. "WaveLAN™ WL54040 Dual-Band Wireless LAN Transciever", Sep. 2003, 99, pp. 1-4.
Allen Telecom Group, Inc., ActiveLite.TM. Antenna, Publication SD-1107, Dec. 1994, 6 pages.
Allen Telecom Group, Inc., MicroFill.RTM, "Systems Engineering Design Guide," Publication SD-1131, Jan. 1995, 12 pages.
Allen Telecom Group, Inc., MicroFill.RTM, "When You Have Customers in High Places," Publication SD-1106, Dec. 1994, 5 pages.
Allen Telecom Group, Inc., "The Secret to MicroLite.RTM's Coverage Success," Publication SD-1115, Jan. 1994, 3 pages.
Avery, John, "Standard Serves In-Building Microcellular PCS," Microwaves & RF, May 1995, pp. 8-12 and 40.
CAL Context Description; Revision SP3485, Rev. Feb. 2, 1996, EIA 600.82, pp. 007651-007667, 17 pages.
Common Application Language (CAL) Specification; Revision SP3484, Rev. Sep. 17, 1996, 007525-007650, EIA 600-81, 77 pages.
Goldberg, Lee, "Broadband to the Home: Challenges on the Last Mile," Electronic Design, Oct. 2, 1995, pp. 67-82.
Goldberg, Lee, "Brains and Bandwidth: Fiber Service at Copper Prices," Electronic Design, Oct. 2, 1995, pp. 51-60.
International Search Report for PCT/US2009/048155 dated Aug. 20, 2009, 10 pages.
Sanchez, et al. "A High-Performance Versatile Residential Gateway", Wireless Communications and Networking Conference, 2000, pp. 560-566.
Dastangoo, et al., "Wireless LAN Technologies and Applications," MILCOM '93 Conference Record, IEEE, vol. 2, 1993, pp. 497-501.
Unknown, "EIA 600.41, Description of the Data Link Layer," Revision IS-60, Jan. 31, 1996, 60 pages.
Unknown, "Draft IS-60.04 Node Communications Protocol Part 6: Application Layer Specification," Revision Apr. 18, 1996, 129 pages.
Unknown, "EIA 600.10 Introduction to the CEBUS Standard," Revision Feb. 5, 1995, 19 pages.
Unknown, "Ethernet Wireless LAN Systems," BYTE Magazine, Feb. 1996, pp. 1, 5, 203.
Evans, G., "CEBus Standard User's Guide: A Complete Technical Overview," May 1996, 316 pages.
Dettmer, "GSM Over Ethernet," IEE Review, Mar. 2002, pp. 37-40.
Hachman, M., "Compaq to Ride the CEBus," EBN, Jan. 22, 1996, 1 page.
Trowbridge, D., "High Cost of Wiring Sparks Wireless LAN Alternatives," Computer Technology Review, vol. XIV, No. 3, Mar. 1994, 8 pages.
Hoffman, J., "Cable,Television and the Consumer Electronic Bus," Jun. 11, 1987, pp. 165-173.
Strassberg, D., "Home Automation Buses: Protocols Really Hit Home," EDN, Apr. 13, 1995, 9 pages.
Unknown, "JVC Introduces Ethernet Compatible Wireless LAN System," Business Wire, Sep. 26, 1995, 1 page.
Unknown, "JVC Introduces First Ethernet Compatible Wireless LAN System," Business Wire, Nov. 7, 1995, 1 page.
JVC Introducing VIPSLAN-10, Sep. 1995, 2 pages.
JVC, "JVC Node," JVC Web Site, Accessed Jan. 18, 2007, 2 pages.
JVC, "JVC PC Card & Mobile," JVC Web Site, Accessed Jan. 18, 2007, 2 pages.
JVC, "JVC Power Hub," JVC Web Site, Accessed Jan. 18, 2007, 1 page.
JVC, "JVC Satellite," JVC Web Site, Accessed Jan. 18, 2007, 2 pages.
JVC, "JVC Station," Web Site, Accessed Jan. 18, 2007, 2 pages.
JVC, "JVC T-Adapter," JVC Web Site, Accessed Jan. 18, 2007,1 page.
JVC VIPSLAN-10 Infrared Wireless LAN System, Sep. 1995, 10 pages.
Markwalter, B. E. et al., "CEBus Router Testing," IEEE Transactions on Consumer Electronics, Nov. 1991, vol. 37, No. 4, 8 pages.
Unknown, "EIA 600.42 Node Medium Access Control Sublayer," Revision IS-60, Feb. 22, 1996, 54 pages.
Ophir, et al., "802.11 Over Coax—A Hybrid Coax—Wireless Home Networking Using 802.11 Technology," Texas Instruments, Jan. 2004, 6 pages.
Elmirghani, J., "Optical Wireless Systems and Networks," IEEE Communications, vol. 36, No. 12, Dec. 1998, pp. 70-71.

Pahlavan, et al., "Trends in Local Wireless Networks," Communications Magazine, IEEE, Issue 3, vol. 33, Mar. 1995, pp. 88-95.
Unknown, "EIA-600.28 Power Line/RF Symbol Encoding Sublayer," Revision May 12, 1995, Draft Copy, 64 pages.
Powerhouse, "Wireless Remote Controls," Powerhouse Web Site, Accessed Apr. 5, 2005, 3 pages.
Powerhouse, "Wireless Wall Switches," Powerhouse Web Site, Accessed Apr. 5, 2005, 3 pages.
Unknown, "EIA-600.35, RF Physical Layer and Medium Specification," Revision: IS-600, Aug. 30, 1995, 17 pages.
Unknown, "EIA-600.37, Symbol Encoding Sublayer," Revisions: May 12, 1995, Draft Copy, 30 pages.
Clegg,"VIPSLAN-10 Streaks Off the Wire," LAN Times, Dec. 18, 1995, 1 page.
JVC, "VISPLAN-10 Infrared Wireless LAN System," JVC, May 1996, 10 pages.
Zeino, et al., Functional Approach to a Hybrid Wireless Network for Mobile Stations, Personal, Indoor and Mobile Radio Communications, 5th IEEE International Symposium, Sep. 18-23, 1994, vol. 3, pp. 994-998.

SYSTEM AND METHOD FOR CARRYING A WIRELESS BASED SIGNAL OVER WIRING

CROSS-REFERENCE TO RELATED APPLICATIONS

This application is a continuation of U.S. patent application Ser. No. 12/129,278 filed 29 May 2008, which is a continuation of U.S. patent application Ser. No. 11/066,442 filed 28 Feb. 2005, now abandoned claims any and all benefits of the prior filed applications as provided by law and the contents of each of the earlier filed applications are hereby incorporated by reference in its entirety.

This application is related to U.S. application Ser. No. 11/329,270, filed on 11 Jan. 2006 and 12/038,435, filed on 27 Feb. 2008.

FIELD OF THE INVENTION

The present invention relates to the field of wired communication, and, more specifically, to using wireless oriented signals over a wired medium.

BACKGROUND OF THE INVENTION

Wired Home Networking.

Most existing offices and some of the newly built buildings facilitate a data network structure based on dedicated wiring. However, implementing such a network in existing buildings typically requires installation of new wiring infrastructure. Such installation of new wiring may be impractical, expensive and problematic. As a result, many technologies (referred to as "no new wires" technologies) have been proposed in order to facilitate a LAN in a building without adding new wiring. Some of these techniques use existing utility wiring installed primarily for other purposes such as telephone, electricity, cable television (CATV), and so forth. Such an approach offers the advantage of being able to install such systems and networks without the additional and often substantial cost of installing separate wiring within the building.

The technical aspect for allowing the wiring to carry both the service (such as telephony, electricity and CATV) and the data communication signal commonly involves using FDM technique (Frequency Division Multiplexing). In such configuration, the service signal and the data communication signals are carried across the respective utility wiring each using a distinct frequency spectrum band. The concept of FDM is known in the art, and provides means of splitting the bandwidth carried by a medium such as wiring. In the case of a telephone wiring carrying both telephony and data communication signals, the frequency spectrum is split into a low-frequency band capable of carrying an analog telephony signal and a high-frequency band capable of carrying data communication or other signals.

A network in a house based on using powerline-based home network is also known in the art. The medium for networking is the in-house power lines, which is used for carrying both the mains power and the data communication signals. A PLC (Power Line Carrier) modem converts a data communication signal (such as Ethernet IEEE802.3) to a signal which can be carried over the power lines, without affecting and being affected by the power signal available over those wires. A consortium named HomePlug Powerline Alliance, Inc. of San Ramon, Calif. USA is active in standardizing powerline technologies. A powerline communication system is described in U.S. Pat. No. 6,243,571 to Bullock et al., which also provides a comprehensive list of prior art publications referring to powerline technology and application. An example of such PLC modem housed as a snap-on module is HomePlug1.0 based Ethernet-to-Powerline Bridge model DHP-100 from D-Link® Systems, Inc. of Irvine, Calif., USA. Outlets with built in PLC modems for use with combined data and power using powerlines are described in US Patent Application 2003/0062990 to Schaeffer et al. entitled 'Powerline bridge apparatus'. Such power outlets are available as part of PlugLAN™ by Asoka USA Corporation of San Carlos, Calif. USA.

Similarly, carrying data over existing in home CATV coaxial cabling is also known in the art, for example in US Patent application 2002/0166124 to Gurantz et al. An example of home networking over CATV coaxial cables using outlets is described in US Patent application 2002/0194383 to Cohen et al. Such outlets are available as part of HomeRAN™ system from TMT Ltd. of Jerusalem, Israel.

Telephony Definitions and Background

The term "telephony" herein denotes in general any kind of telephone service, including analog and digital service, such as Integrated Services Digital Network (ISDN).

Analog telephony, popularly known as "Plain Old Telephone Service" ("POTS") has been in existence for over 100 years, and is well-designed and well-engineered for the transmission and switching of voice signals in the 300-3400 Hz portion (or "voice band" or "telephone band") of the audio spectrum. The familiar POTS network supports real-time, low-latency, high-reliability, moderate-fidelity voice telephony, and is capable of establishing a session between two end-points, each using an analog telephone set.

The terms "telephone", "telephone set", and "telephone device" herein denote any apparatus, without limitation, which can connect to a Public Switch Telephone Network ("PSTN"), including apparatus for both analog and digital telephony, non-limiting examples of which are analog telephones, digital telephones, facsimile ("fax") machines, automatic telephone answering machines, voice (a.k.a. dial-up) modems, and data modems.

The terms "data unit", "computer" and "personal computer" ("PC") are used herein interchangeably to include workstations, Personal Digital Assistants (PDA) and other data terminal equipment (DTE) with interfaces for connection to a local area network, as well as any other functional unit of a data station that serves as a data source or a data sink (or both).

In-home telephone service usually employs two or four wires, to which telephone sets are connected via telephone outlets.

Home Networking Existing in-House Wiring.

Similarly to the powerlines and CATV cabling described above, it is often desirable to use existing telephone wiring simultaneously for both telephony and data networking. In this way, establishing a new local area network in a home or other building is simplified, because there is no need to install additional wiring. Using FDM technique to carry video over active residential telephone wiring is disclosed by U.S. Pat. No. 5,010,399 to Goodman et al. and U.S. Pat. No. 5,621,455 to Rogers et al.

Existing products for carrying data digitally over residential telephone wiring concurrently with active telephone service by using FDM commonly uses a technology known as HomePNA (Home Phoneline Networking Alliance) whose phonelines interface has been standardized as ITU-T (ITU Telecommunication Standardization Sector) recommendation G.989.1. The HomePNA technology is described in U.S. Pat. No. 6,069,899 to Foley, U.S. Pat. No. 5,896,443 to Dichter, U.S. Patent application 2002/0019966 to Yagil et al., U.S.

Patent application 2003/0139151 to Lifshitz et al. and others. The available bandwidth over the wiring is split into a low-frequency band capable of carrying an analog telephony signal (POTS), and a high-frequency band is allocated for carrying data communication signals. In such FDM based configuration, telephony is not affected, while a data communication capability is provided over existing telephone wiring within a home.

Prior art technologies for using the in-place telephone wiring for data networking are based on single carrier modulation techniques, such as AM (Amplitude Modulation), FM (Frequency Modulation) and PM (Phase Modulation), as well as bit encoding techniques such as QAM (Quadrature Amplitude Modulation) and QPSK (Quadrature Phase Shift Keying) and CCK (Complementary Code Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, and in particular in WLAN networks. As explained in the document entitled "*IEEE* 802.11g *Offers Higher Data Rates and Longer Range*" to Jim Zyren et al. by Intersil which is incorporated herein by reference, multi-carrier modulation (such as OFDM) is employed in such wireless systems in order to overcome the signal impairment due to multipath. Since OFDM as well as other spread spectrum technologies are considered to be complex and expensive (requiring Digital Signal Processors—DSP), and since telephone wiring is considered a better communication medium wherein multipath is less considered as a major impairment than it is in wireless networks, OFDM technique (and any other spread spectrum or any multi-carrier modulation), which is considered to be powerful and high performance, has not been suggested as a dominant modulation for wired communication in general and over telephone wiring in particular.

There is thus a widely recognized need for, and it would be highly advantageous to have a method and system for using spread spectrum modem technologies such as OFDM for wired applications, such as over utility wiring, and in particular over telephone wiring.

Wireless Home Networking.

A popular approach to home networking (as well as office and enterprise environments) is communication via radio frequency (RF) distribution system that transports RF signals throughout a building to and from data devices. Commonly referred to as Wireless Local Area Network (WLAN), such communication makes use of the Industrial, Scientific and Medical (ISM) frequency spectrum, which is unregulated and license free. In the US, three of the bands within the ISM spectrum are the A band, 902-928 MHz; the B band, 2.4-2.484 GHz (a.k.a. 2.4 GHz); and the C band, 5.725-5.875 GHz (a.k.a. 5 GHz). Overlapping and/or similar bands are used in different regions such as Europe and Japan.

In order to allow interoperability between equipments manufactured by different vendors, few WLAN standards have evolved, as part of the Institute of Electrical and Electronic Engineers (IEEE) 802.11 standard group, branded as WiFi Error! Hyperlink reference not valid. the Wi-Fi Alliance of Austin, Tex., USA. IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. This is described in an Intel White Paper entitled "54 Mbps *IEEE* 802.11 *Wireless LAN at* 2.4 *GHz*", and a chip-set is described in an Agere Systems White Paper entitled "802.11 *Wireless Chip Set Technology White Paper*", both of these documents being incorporated herein by reference.

A node/client with a WLAN interface is commonly referred to as STA (Wireless Station/Wireless client). The STA functionality may be embedded as part of the data unit, or alternatively may be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to herein as WLAN unit.

Bandwidth allocation for IEEE802.11g wireless in the USA is shown as graph 20 in FIG. 2, along the frequency axis 27. In order to allow multiple communication sessions to take place simultaneously, eleven overlapping channels are defined spaced 5 MHz apart, spanning from 2412 MHz as the center frequency for channel number 1 (shown as 23), via channel 2 centered at 2417 MHz (shown as 24) and 2457 MHz as the center frequency for channel number 10 (shown as 25), up to channel 11 centered at 2462 MHz (shown as 26). Each channel bandwidth is 22 MHz, symmetrically (±11 MHz) located around the center frequency.

WLAN unit block diagram 10 is shown in FIG. 1. For the sake of simplicity, only IEEE802.11g will be described from now on. In general, the wireless physical layer signal is handled in two stages. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting in a 22 MHz (single channel wide) frequency band signal. The signal is then up converted to the 2.4 GHz (RF) and placed in the center frequency of the required channel, and wirelessly transmitted via the antenna. Similarly, the receiving path comprises a received channel in the RF spectrum, down converted to the baseband (IF) from which the data is then extracted.

The WLAN unit 10 connects to the wired medium via port 11, supporting an IEEE802.3 10/100BaseT (Ethernet) interface. The physical layer of this interface is handled by a 10/100BaseT PHY function block 12, converting the incoming Manchester or MLT3 modulated signal (according to the 10BaseT or 100BaseTX coding, respectively) into a serial digital stream. Similarly, a WLAN outgoing digital data stream is modulated to the respective coded signal and transmitted via the port 11, implementing full duplex communication. The internal digital stream may be of proprietary nature of any standard such as MII (Media Independent Interface). Such MII to Ethernet PHY 12 (a.k.a. Ethernet physical layer or Ethernet transceiver) can be implemented based on LAN83C180 10/100 Fast Ethernet PHY Transceiver available from SMSC—Standard Microsystems Corporation of Hauppauge, N.Y. U.S.A. While this function can be implemented by using a single dedicated component, in many embodiments this function is integrated into single component including other functions, such as handling higher layers. The PHY block 12 also comprises the isolation magnetics, balancing, surge protection and connector (commonly RJ-45) required for proper and standard interface via port 11.

For the sake of simplicity, in the foregoing and subsequent description only Ethernet 10/100BaseT interface will be described. However, it will be appreciated that any wired interface, being proprietary or standard, packet or synchronous, serial or parallel may be equally used, such as IEEE1394, USB, PCI, PCMCIA or IEEE1284. Furthermore, multiple such interfaces (being of the same type or mixed) may also be used.

In the case wherein the WLAN unit is integrated and enclosed within another unit (such as data unit, e.g. computer) and does not support a dedicated and direct wired interface, the function of block 12 may be omitted.

MAC (Media Access Control) and higher layers are handled in function block 13, comprising two sub blocks, designated as 10/100BaseT MAC block 13a and IEEE802.11g MAC block 13b (typically, the same MAC device is used for all IEEE802.11 variants, such as a/b/g). The MAC block 13a handles the MAC layer according to IEEE802.3 MAC associated with the wired port 11. Such a function block 13a may be implemented using LAN91C111 10/100 Non-PCI Ethernet Single Chip MAC+PHY available from SMSC—Standard Microsystems Corporation of Hauppauge, N.Y. U.S.A, which includes both the MAC 13a and the PHY 12 functionalities. Reference is made to the manufacturer's data sheet: SMSC—Standard Microsystems Corporation, LAN91C111 10/100 Non-PCI Ethernet Single Chip MAC+PHY, Datasheet Rev. 15 (Feb. 20, 2004), which is incorporated herein by reference. Similarly, the MAC block 13b handles the MAC layer according to IEEE802.11g MAC associated with the wireless port 22. Such MAC 13b is designed to support multiple data rates, encryption algorithms and is commonly based on an embedded processor and various memories. Such a functional block 13b may be implemented using WaveLAN™ WL60040 Multimode Wireless LAN media Access Controller (MAC) from Agere Systems of Allentown, Pa. U.S.A., whose a product brief is incorporated herein by reference, which is part of a full chip-set as described in WaveLAN™ 802.11a/b/g Chip Set document from Agere Systems of Allentown, Pa. U.S.A., which is incorporated herein by reference. Reference is made to the manufacturer's data sheet Agere Systems, WaveLAN™ WL60040 Multimode Wireless LAN Media Access Controller (MAC), Product Brief August 2003 PB03-164WLAN, which is incorporated herein by reference. All the bridging required in order to connect the wired IEEE802.3 MAC handled by block 13a to the wireless IEEE802.11g MAC handled by block 13b is also included in functional block 13, allowing for integrated and proper operation.

The data stream generated by the IEEE802.11g MAC 13b is converted to an OFDM-based baseband signal (and vice versa) by the baseband processor 18. In common applications, the baseband processor 18 (a.k.a. wireless modem and IF transceiver) is implemented by a transmitter/receiver 14 digitally processing the data stream, and an analog unit (I-Q modulator) 15 generating the actual signal. The communication channel in wireless environments imposes various impairments such as attenuation, fading, multi-path, interferences among others, and the transmitter may process the data stream according to the following functions:

a. Packet framing, wherein the data from the MAC 13 is adapted and organized as packets, wherein header, CRC, preamble, control information and end-of-frame delimiter are added.
  b. Scrambler.
  c. Convolution encoder (such as Viterbi encoder) to allow better robustness against channel impairments such as impulse and burst noise.
  d. Puncturer to reduce the required data rate.
  e. Interleaver performing permutations on the packet blocks (e.g. bytes) in order to better immune against error bursts by spreading the information.
  f. IFFT modulator to produce separate QAM (quadrature Amplitude Modulation) constellation sub-carriers.

Using digital to analog conversion, the processed digital from the transmitter 14 is used to generate the OFDM baseband signal in the modulator 15. The received OFDM baseband signal from functional block 16 is digitized by the modulator 15, processed by the receiver 14, transferred to MAC 13 and PHY 12 to be conveyed via port 11. Some implementations of WLAN chipsets provide the actual baseband signal, while others provides orthogonal analog I/Q modem signals which need to be further processed to provide the actual real analog form IF (Intermediate Frequency) OFDM baseband signal. In such a case, as known in the art, a Local Oscillator (LO) determining the IF frequency is used to generate a sine wave which is multiplied by the I signal, added to the Q signal multiplied by 90 degrees shifted LO signal, to produce the real analog IF baseband signal. Such function can be implemented based on Maxim MAX2450 3V, Ultra-Low-Power Quadrature Modulator/Demodulator from Maxim Integrated Products of Sunnyvale, Calif. U.S.A, a data sheet of which is incorporated herein by reference. The baseband processor block 18 may be implemented based on Wave-LAN™ WL64040 Multimode Wireless LAN Baseband from Agere Systems of Allentown, Pa. U.S.A., whose product brief is incorporated herein by reference. SA5250 Multi-Protocol Baseband from Philips Semiconductors including both baseband processor 18 and MAC 13b functionalities may be alternatively used.

The RF-IF Converter functional block 16 shifts the IF OFDM baseband signal from the IF band to the ISM RF band. For example, an OFDM baseband signal symmetrically centered around 10 MHz and required to use channel 2 centered at 2417 MHz, is required to be frequency shifted by 2417−10=2407 MHz. Such frequency conversion may use many methods known in the art. A direct modulation transmitter/receiver may be used, such as WaveLAN™ WL54040 Dual-Band Wireless LAN Transceiver from Agere Systems of Allentown, Pa. U.S.A., for directly converting the orthogonal I-Q analog signal to the 2.4 GHz RF band. A product brief is incorporated herein by reference. Alternatively, superheterodyne (dual conversion, for example) architecture may be used, as described for SA5251 Multiband RF Transceiver from Philips Semiconductors. The converter 16 and the baseband processor 18 constitute the wireless path physical layer processor 17.

A T/R switch 19 is used to connect the antenna 22 to the transmitter path and disconnect the receiver path (to avoid receiver saturation) only upon a control signal signaling transmission state of the WLAN unit 10. PIN Diode switch based design is commonly used, such as PIN Diode switch SWX-05 from MCE-KDI Integrated Products of Whippany, N.J. U.S.A., whose data sheet is incorporated herein by reference. The antenna 22 is coupled via a RF filter 21 in order to ensure transmitting limited to the defined band mask (removing unwanted residual signals), and to filter out noise and out of band signal in the receiving mode. Such RF filter 21 may use SAW (Surface Acoustic wave) technology, such as 2441.8 MHz SAW Filter from SAWTEK (A TriQuint company) of Orlando, Fla. U.S.A., whose data sheet is incorporated herein by reference.

Actual implementation of the WLAN unit 10 may also involve amplifiers, attenuators, limiters, AGC (Automatic Gain Control) and similar circuits involved with signal level functions. For example, a Low Noise Amplifier (LNA), such as MAX2644 2.4 GHz SiGe, High IP3 Low-Noise Amplifier is commonly connected in the receive path near the antenna 22. Similarly, a Power Amplifier (PA) is used in the transmit path, such as MAX2247 Power Amplifier for IEEE802.11g WLAN. Both the LNA and the PA are available from Maxim Integrated Products of Sunnyvale, Calif. U.S.A. For the sake of simplicity, such functions are omitted in FIG. 1 as well as in the rest of this document. Similarly, wherever either a transmitting or a receiving path is described in this document, it should be understood that the opposite path also exists for configuring the reciprocal path.

Outlets

The term "outlet" herein denotes an electro-mechanical device, which facilitates easy, rapid connection and disconnection of external devices to and from wiring installed within a building. An outlet commonly has a fixed connection to the wiring, and permits the easy connection of external devices as desired, commonly by means of an integrated connector in a faceplate. The outlet is normally mechanically attached to, or mounted in, a wall or similar surface. Non-limiting examples of common outlets include: telephone outlets for connecting telephones and related devices; CATV outlets for connecting television sets, VCR's, and the like; outlets used as part of LAN wiring (a.k.a. structured wiring) and electrical outlets for connecting power to electrical appliances. The term "wall" herein denotes any interior or exterior surface of a building, including, but not limited to, ceilings and floors, in addition to vertical walls.

Wireless Coverage.

Most existing wireless technologies such as IEEE802.11x (e.g. IEEE802.11a/g/b), BlueTooth™, UWB (Ultra Wide-Band) and others are limited to tens of meters in free line of sight environment. In common building environments, wherein walls and other obstacles are present, the range may be dramatically reduced. As such, in most cases a single wireless unit (such as an access point) cannot efficiently cover the whole premises. In order to improve the coverage, multiple access points (or any other WLAN units) are commonly used, distributed throughout the premises.

In order to allow the access points to interconnect in order to form a single communication cluster in which all the WLAN units can communicate with each other and/or with wired data units, a wired backbone is commonly used, to which the access points are connected. Such a network combining wired and wireless segments is disclosed for example in U.S. Pat. No. 6,330,244 to Swartz et al. Such a configuration is popular today in offices, businesses, enterprises, industrial facilities and other premises having a dedicated wiring network structure, commonly based on Category 5 cabling (a.k.a. structured wiring). The access points interface the existing wiring based on local area network (LAN), commonly by a standard data interface such as Ethernet based 10/100BaseT.

However, installing a dedicated network wiring infrastructure in existing houses is not practical as explained above. The prior art discloses using existing AC power wiring also as the wired backbone for interconnecting WLAN units. Examples of such prior art includes U.S. Pat. No. 6,535,110 to Arora et al., U.S. Pat. No. 6,492,897 to Mowery, Jr., U.S. Patent application 2003/0224728 to Heinonen et al., U.S. Pat. No. 6,653,932 to Beamish et al. Using powerlines as a backbone for connecting WLAN units involves several drawbacks. The type of wiring, noise and the general hostile environment results in a poor and unreliable communication medium, providing low data rates and requiring complex and expensive modems. In addition, the connection of a WLAN unit to the powerline requires both wireless and powerline modems for handling the physical layer over the two media involved, as well as a complex MAC (Media Access control) to bridge and handle the two distinct protocols involved. As such, this solution is complex, expensive and offers low reliability due to the amount of hardware required.

There is thus a widely recognized need for, and it would be highly advantageous to have a method and system for using wireless modem technologies and components in a wired applications. Furthermore, it would be highly advantageous to have a method and system for cost effectively enlarging the coverage of a wireless network by carrying a wireless signal over a wired medium without converting to a dedicated wired modem signal.

SUMMARY OF THE INVENTION

It is therefore an object of the invention to provide a method and system for using standard existing wireless components for wired communication.

According to the invention, a standard wireless baseband signal that is conducted by existing wireless components (widely used for wireless transmission), is coupled and carried by a wiring, as a substitute for a dedicated wiring modem. As such, a network (such as local area network) can be configured over the wiring, either in bus topology, point-to-point or any other arbitrary network topology. The invention is based on a WLAN unit design, comprising a wired data port and a wireless port (e.g. antenna) and enabling a data unit connected to the wired data port (either proprietary or standard) to wirelessly communicate with other data unit.

In one aspect of the present invention, a device is based on a WLAN data design. However, only the baseband signal is used, so that the baseband to RF portion (hereinafter 'RF portion') of the WLAN unit may be obviated. The baseband signal may be coupled to the wiring via isolation, analog switching, driver and receiver, filtering and impedance matching functionalities, allowing for networking over the wiring with one or more similar devices coupled thereto.

In another aspect of the present invention, the RF portion of the WLAN unit is also used. In this case, an up/down converter is connected to the RF port (instead of connecting antenna thereto). The converter shifts the center frequency down to a band usable over the wiring.

In another aspect of the present invention, the full functionality of the WLAN unit is retained, including both the antenna and the RF portion. A wiring port coupled either directly to the baseband signal or to the RF signal via an up/down converter is added. In this case, a three ports sharing device is formed, having a wiring port, wireless (antenna) port and data unit port. Data units connected to a network comprising such multiple devices may be interconnected by the wired medium (via the wiring) or via the air using the RF signals propagating through the air.

In another aspect of the present invention, the device comprises only the RF portion of a WLAN unit (including antenna). The antenna RF signal is frequency shifted by an up/down converter to a frequency band usable by the wiring (e.g. baseband signal). A similar device or a device according to any of the above embodiments connected to the wiring may couple to the signal, and use it for coupling to a data unit either directly or wirelessly.

Any single pair wiring may be used as a medium for the baseband signal. In another aspect of the present invention, the wiring is utility wiring in a building, such as telephone, CATV or AC power wiring. In the case wherein the utility wiring also carries an active service signal (e.g. telephone, CATV or AC power signal respectively), FDM technique is used, wherein the service signal and the baseband signal are carried in distinct frequency bands. In another aspect of the present invention, the device further provides a service connector allowing a service unit to be connected thereto. In any case of wiring carrying active service signal, various filters are employed in order to isolate the service signal from the baseband signal, to avoid any interference between the two signals.

In another aspect of the present invention, the device may be comprised in a data unit. Alternatively, the device may be enclosed as a stand-alone dedicated unit. In another aspect of the present invention, the device is comprised within a service outlet. Alternatively, the device may be enclosed as outlet add-on module.

The device may be locally powered by a dedicated connection to a local power source (e.g. AC power, directly or via AC/DC converter). Alternatively, the device is power fed from a power signal carried over the wiring. In the latter case, a circuitry isolating the power signal carried over the wiring is employed. In another aspect of the present invention, the device is powered by a data unit connected thereto.

In another aspect of the present invention, spread spectrum (either DSSS or FHSS) techniques such as employing a multi-carrier modulation (e.g. OFDM, DMT or CDMA) modem, which due to its complexity is mainly used for wireless applications, may be used over a wired medium such as utility wiring in a building (e.g. telephone wiring).

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope of the present invention as defined by the claims. Accordingly, the drawings and detailed description are to be regarded as illustrative in nature and not as restrictive.

BRIEF DESCRIPTION OF THE DRAWINGS

The invention is herein described, by way of non-limiting example only, with reference to the accompanying drawings, wherein.

DESCRIPTION OF EXEMPLARY EMBODIMENTS OF THE INVENTION

Figure 1:
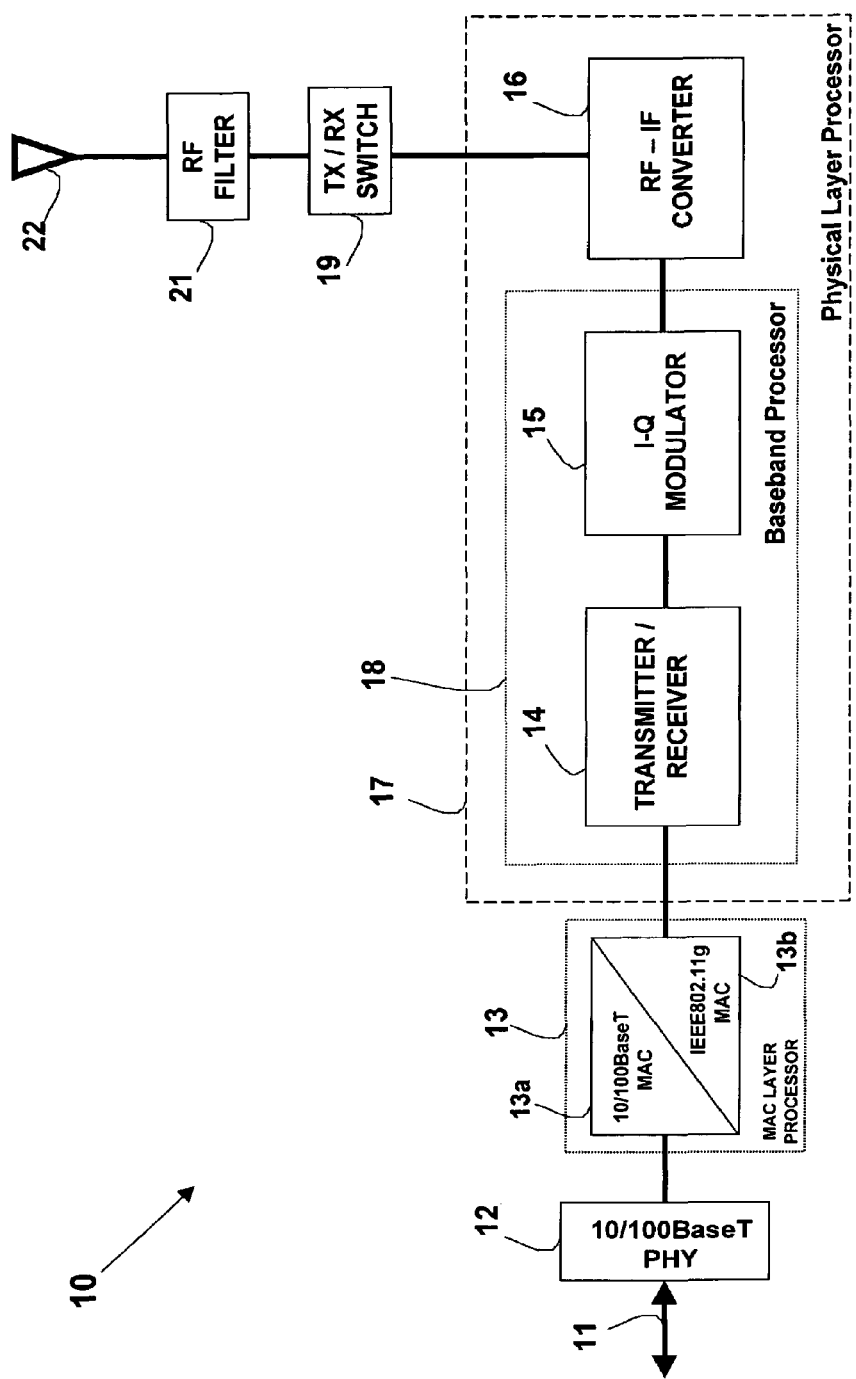
FIG. 1 shows schematically a general functional block diagram of a prior art WLAN unit.

The principles and operation of a network according to the present invention may be understood with reference to the drawings and the accompanying description wherein similar components appearing in different figures are denoted by identical reference numerals. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 3:
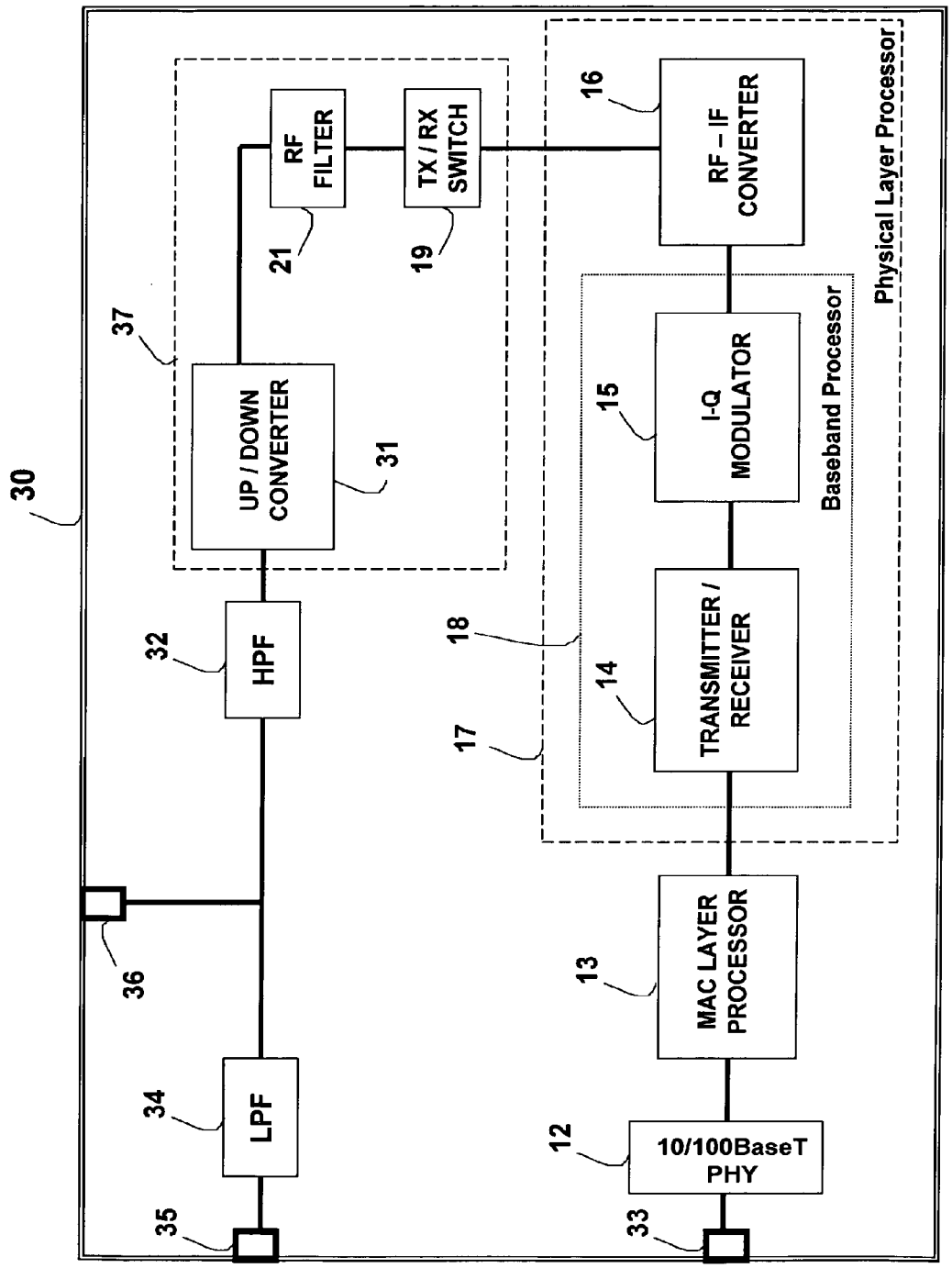
FIG. 3 shows schematically a general functional block diagram of an exemplary OFDM modem according to the invention.
Figure 4:
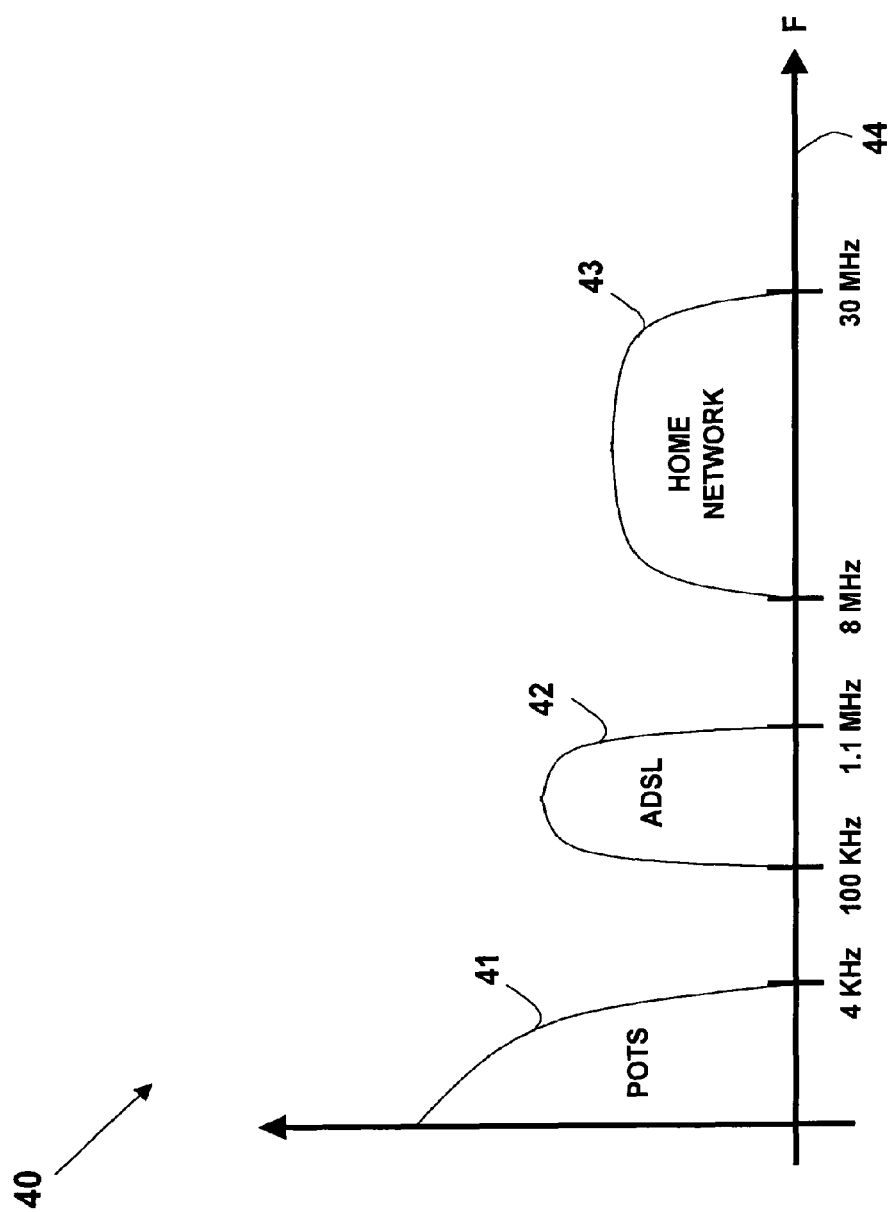
FIG. 4 shows schematically the frequency spectrum allocation over the telephone wiring according to the invention.

A wireless based OFDM modem 30 adapted for operating over telephone wiring according to one or more embodiments of the present invention is described in FIG. 3. OFDM modem 30 is primarily based on the design and components shown as WLAN unit 10 in FIG. 1. In contrast to WLAN unit 10, the RF signal is not coupled to antenna 22, but rather connect to an up/down converter 31. The converter 31 shifts the ISM band baseband signal to a band usable over telephone wiring in home/office or any other building. Owing to FCC regulation in North America regarding radiated electromagnetic emission, the usable frequency band is considered to extend up to 30 MHz. Hence, a spectrum allocation for a baseband signal occupying 22 MHz may be between 8 MHz and 30 MHz (centered around 19 MHz), as shown in curve 43 being part of graph 40 in FIG. 4, illustrating the various power levels allocation along the frequency axis 44. Such allocation allows for ADSL signal 42 using the 100 KHz (or 25 KHz) to 1.1 MHz and the POTS signal curve 41. ADSL is an acronym for Asymmetric Digital Subscriber Line uses standard phone lines to deliver high-speed data communications both upstream and downstream, using a part of a phone line's bandwidth not used for voice so as to allow simultaneous voice and data communication.

Figure 2:
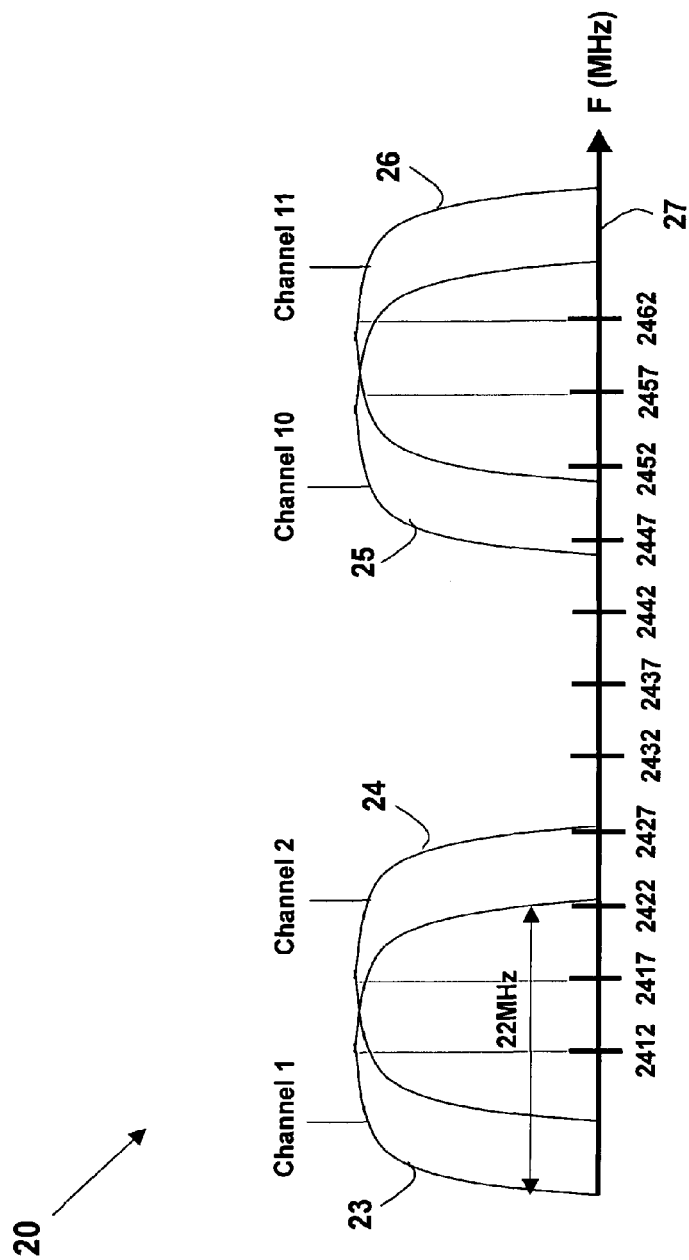
FIG. 2 shows schematically the frequency spectrum allocation of IEEE802.11g standard.

As a non-limiting example, in the case wherein the WLAN unit 30 is using channel 10 (shown as curve 25 in FIG. 2) centered around 2457 MHz, the converter is required to shift the frequency up or down by 2457−19=2438 MHz resulting in the frequency allocation shown in graph 40.

In order to avoid interference to and from the other signals (POTS 41 and ADSL 42) carried over the same telephone pair, a High Pass Filter (HPF) 32 is connected between the converter 31 and the telephone wiring connector 36. The telephone wiring connector 36 in commonly a telephone standard RJ-11 plug used in North America, allowing for coupling the OFDM modem 30 to the telephone pair. The HPF 32 may use passive components implementing a Butterworth filter scheme. In some cases, a telephone unit is required to share the same telephone wiring connector 35. In such a case, a Low Pass Filter (LPF) 34 is used to isolate the POTS frequency band, allowing a telephone set to couple to the telephone connector 35 via a telephone jack (e.g. RJ-11 jack). Any common filter used to isolate POTS and ADSL signals (a.k.a. micro-filter) may be used as LPF 34, comprising discrete capacitors and inductors). Such configuration of connecting modem and telephone via a set of LPF and HPF units is known in the art and commonly used also in HomePNA environment.

OFDM and other spread spectrum modulation techniques are known to be powerful, robust and high-performance. Yet, their implementation complexity and associated costs have militated against their use in communication systems. Even the first WLAN technologies introduced used single-carrier technologies, such as IEEE802.11b using CCK. As such, the OFDM modem 30 shown in FIG. 3 may be used as a superior substitute to the prior art HomePNA based phonelines communication. Since the powerful OFDM technology is used, the modem performance is expected to exceed any available or future HomePNA technology using single carrier modulation (such as QAM) as known in the prior-art. Furthermore, since the modem utilizes existing off-the-shelf wireless oriented components such as the wireless MAC 13b, the baseband processor 18 and the RF-IF converter 16, the required effort to develop a dedicated modem is obviated. Furthermore, the rapid proliferation of the WLAN solutions to the residential, office, enterprise and industrial applications, a trend expected to even grow in the future, indicates a high volume of WLAN components, resulting in easy availability, low price and ensured interoperability.

Figure 5:
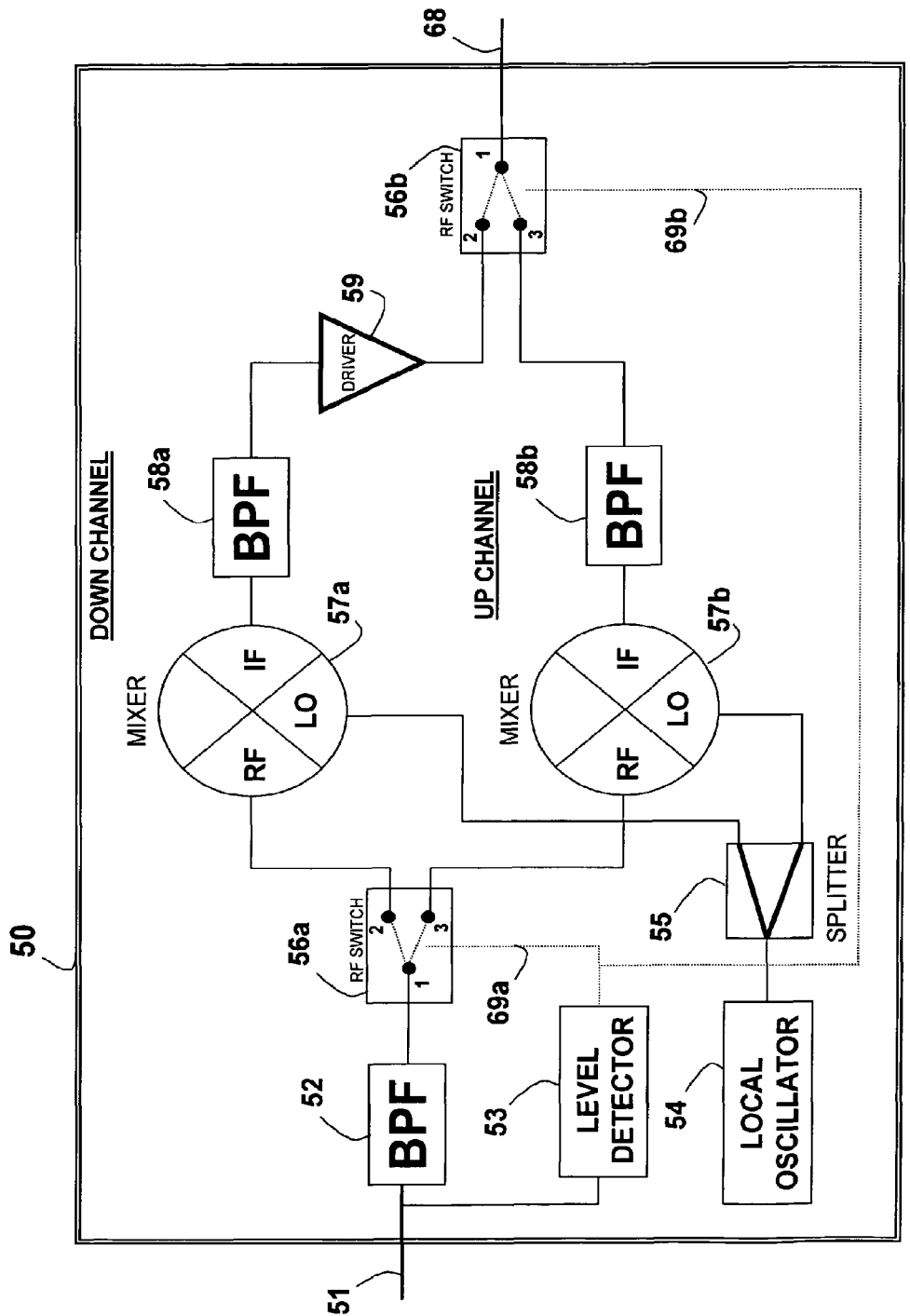
FIG. 5 shows schematically a general functional block diagram of an exemplary up/down converter according to the invention.

Up/Down converter 31 used for shifting the frequency as described above is well known in the art. Such converters are known to use mixing and filtering techniques, and may use single or multiple stages (Superheterodyne scheme) as well as Direct Conversion (DC) architecture. A non-limiting example for Up/Down Converter function block 37, shown in FIG. 3 to include the functions of the converter unit 31, the RF filter 21 and TX/RX Switch 19, is shown as block 50 in FIG. 5. Such a block 50 shifts the frequency of the RF signal coupled to port 51 to a low frequency (IF) signal in port 68. RF Signal received in port 51 is shifted down by a down channel based on mixer 57a and Band Pass Filter (BPF) 58a and is outputted at port 68. Similarly, an IF signal received in port 68 is shifted to the RF band by the up channel comprising mixer 57b and BPF 58b, and as RF signal outputted via port 51. The RF port 51 is coupled to the HPF 32 of the OFDM modem 30 and the IF port 68 is coupled to the RF-IF converter 16 of the OFDM modem 30.

While transmitting to the telephone pair via connector 36, a RF signal received in port 51 (from the RF-IF converter 16) is first filtered by the BPF 52 to remove any unwanted signals residing outside the frequency band of the RF channel (e.g. the ISM RF channel band). Since the converter 50 allows conversion in only one direction at a time, either up or down, ganged switches 56a and 56b are used, having a center pole marked as (1) and two throw states marked as (2) and (3). When converting from RF to IF, both switches 56a and 56b are in the (2) state, hence the down channel is operative. Such a switch may be based on PIN diode as explained above regarding switch 19. The RF signal from the RF port 51 couples to mixer 57a via BPF 52 and switch 56a. The mixer 57a multiplies the local oscillator 54 sine wave signal provided to its LO port via a splitter 55 by the RF signal coupled to its RF port (using its non linear characteristics), yielding in its IF port a signal having two main components, one around the sum of the frequencies and one around their difference. The frequencies' sum signal is then filtered out by the BPF 58a, and fed to the IF port 68 via the switch 56b. A driver 59 may also be included in order to allow proper driving of the load connected to port 68. In a similar way, when receiving from the telephone pair, an IF signal from port 68 (originated in the telephone pair, and coupled via connector 36 and HPF 32), is routed via the switch 56b (now in state (3)) to the IF port of mixer 57b, via BPF 58b. A signal is also fed from the local oscillator 54 via splitter 55 to the LO port of the mixer 57b, which outputs an RF signal to port 51 via the switch 56a (now in state (3)) and BPF 52. A level detector (or comparator) 53 is used to monitor the level of the revived RF signal, and accordingly operate the switches 56a and 56b via control channels 69b and 69a respectively.

The converter 50 has been described above as having dedicated up and down channels. However, since only one channel is used at a time and the two channels are not used simultaneously, a single channel (mixer) may also be used, wherein an appropriate switching mechanism is employed.

Figure 6:
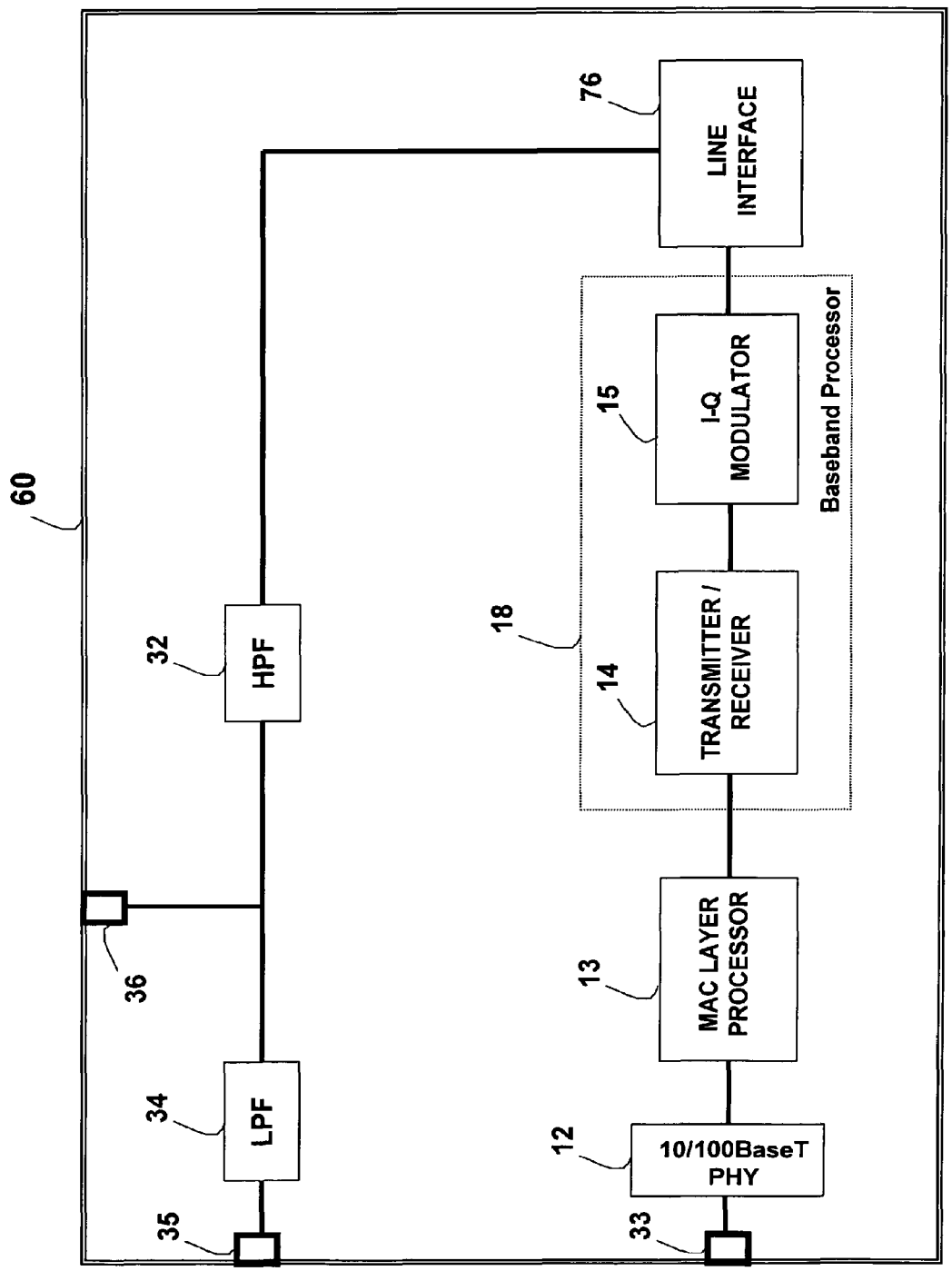
FIG. 6 shows schematically a general functional block diagram of an exemplary OFDM modem according to the invention.

A level detector 53 may be designed based on LM311 Voltage Comparator available from National Semiconductors headquartered in Santa-Clara, Calif. U.S.A. The local oscillator 54 may be based on quartz crystal oscillator, wherein the frequency is multiplied using Phase Locked Loop (PLL) circuits, and may comprise T83027 PLL Clock Generator IC with VCXO available from TLSI Incorporated of Huntington, N.Y. U.S.A., whose data sheet is incorporated herein by reference. A mixer 57 may be designed based on MAX9993 High Linearity 1700 MHz Down-Conversion Mixer with LO Buffer/Switch available from Maxim Integrated Products of Sunnyvale, Calif. U.S.A, whose data sheet is incorporated herein by reference. It should be noted that other techniques and methods to implement the converter block 50 functionality are known in the art and may be equally used. Typically, converter block 50 may connect to the telephone wiring using line interface functionalities such as isolation, impedance matching, driving/receiving and filtering, as will be described below for line interface 76 shown in FIG. 6.

The OFDM modem 30 inherently employs double frequency conversions: from IF to RF by converter 16 and back to low frequency by converter 31. This redundancy may be obviated by directly extracting the baseband signal without going through the RF stage, as shown in OFDM modem functional block diagram 60 illustrated in FIG. 6, which may be used in one or more embodiments of the present invention.

Similar to modem 30, modem 60 is based on WLAN unit 10 described in FIG. 1. However, the OFDM baseband signal generated by the broadband processor 18 is not frequency shifted to RF, but rather handled directly in the IF spectrum. In one non-limiting example, the baseband processor 18 provides an orthogonal analog I/Q signal pair. In this case, a line interface 76 using a Quadrature Modulator/Demodulator 191 shown in FIG. 6a converts the signals directly to a baseband analog signal centered around 19 MHz (for example by using 19 MHz local oscillator) in the example of spectrum allocation according to graph 40. In another example, an analog signal centered around another frequency is output by the WLAN components comprising baseband processor 18, and in such a case a simple and single frequency conversion may be used in order to center the signal around 19 MHz.

Figure 6A:
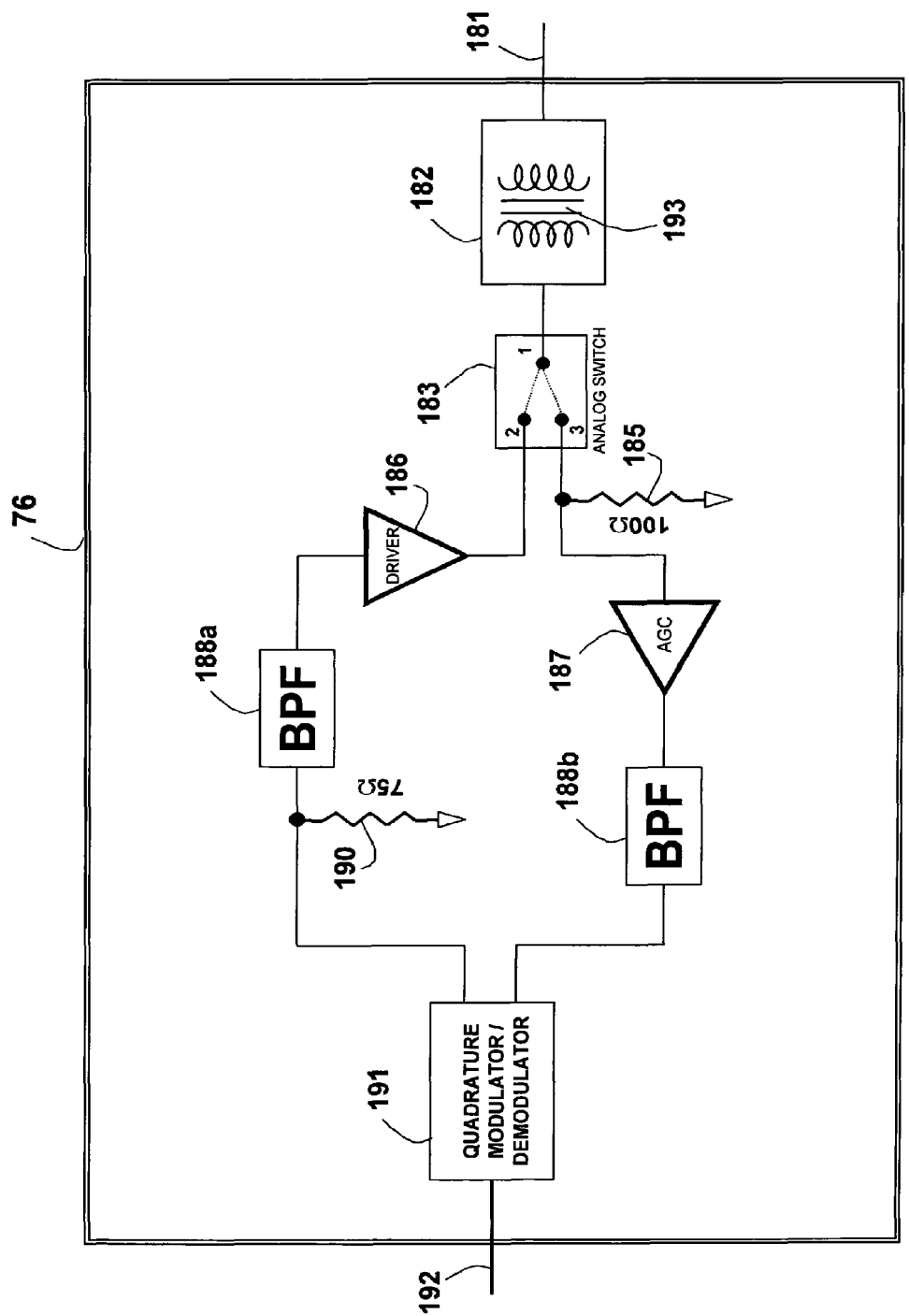
FIG. 6a shows schematically a general functional block diagram of an exemplary line interface according to the invention.

A functional block diagram of the line interface 76 is shown in FIG. 6a. The line interface 76 couples to the I-Q modulator 15 in the baseband processor 18 via port 192. The I-Q signals are converted into a single real signal centered around the 19 MHz frequency (shifted from zero) by the Quadrature Modulator/Demodulator 191, which may be based on Maxim MAX2450 3V, Ultra-Low-Power Quadrature Modulator/Demodulator from Maxim Integrated Products of Sunnyvale, Calif. U.S.A, whose data sheet which is incorporated herein by reference. The Modulator/Demodulator output impedance is 75 ohms terminated by a resistor 190 (if required), and fed to a driver 186 via BPF 188a, passing only the required band (e.g. band 43 in graph 40). An analog switch 183 routes the transmitted signal to the telephone wiring (via port 36 and HPF 32) via an isolation unit 182 and through port 181. The isolation unit 182 is typically based on a signal transformer 193, and serves to reduce common-mode noises so as to provide a balanced signal, as well as meeting the required safety and ESD requirements imposed by the UL in the U.S.A. and CE in Europe.

Similarly, a signal received from the telephone wiring is isolated by the isolation unit 182, and routed via the analog switch 183 to an AGC 187. A 100 Ohm resistor 185 serves as a termination, matching the telephone wiring characteristic impedance to avoid reflection. After being filtered by a BPF 188b, the signal is I-Q modulated by the modulator 191 and coupled to the baseband processor 18.

Figure 6B:
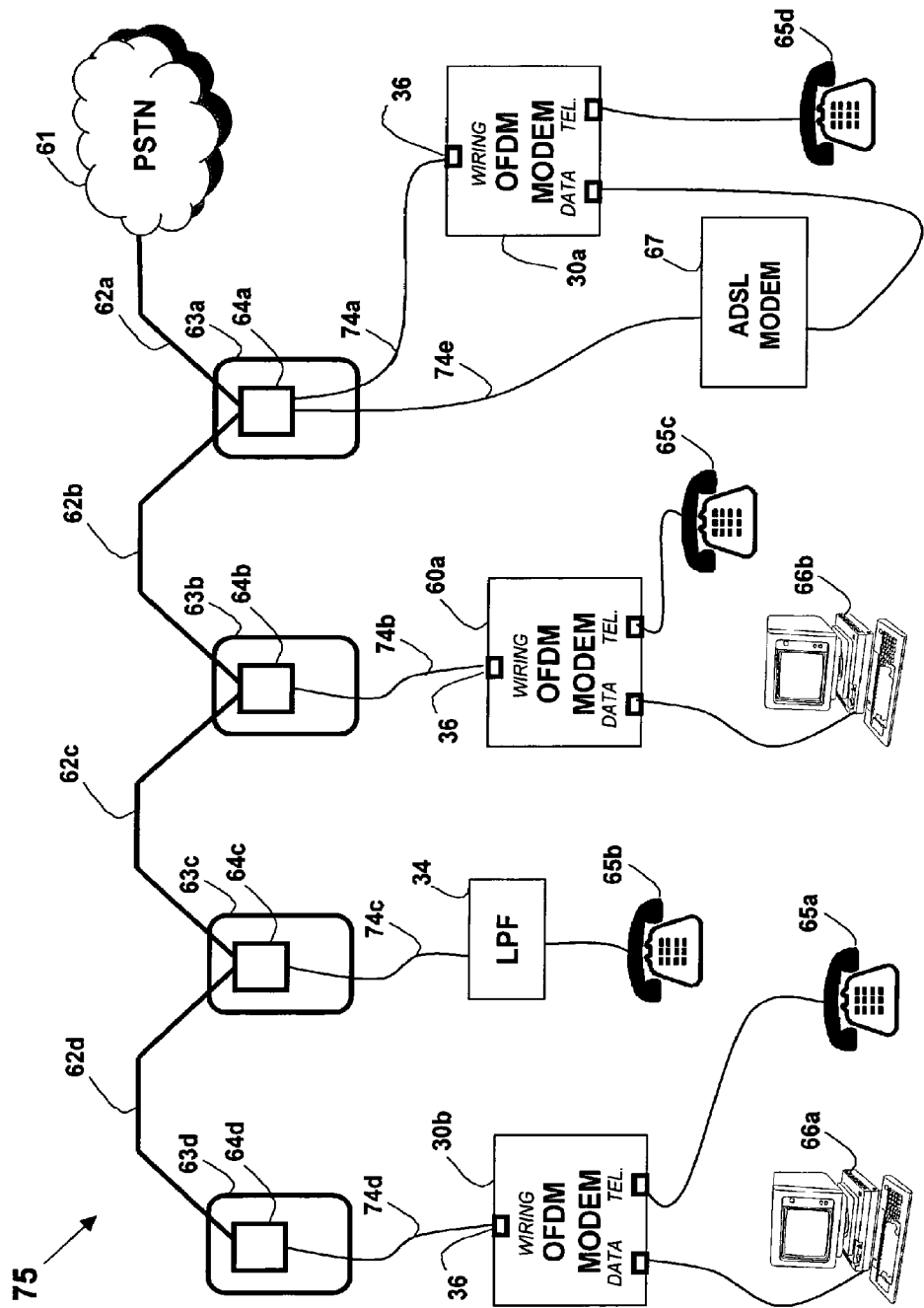
FIG. 6b shows schematically a general functional block diagram of an exemplary network according to the invention.

A sample network 75 over a telephone line using OFDM modems is shown in FIG. 6b. A telephone wiring infrastructure as commonly exists in residences in North America is described, based on single telephone pair 62 accessed via outlets 63. A daisy-chain configuration is shown, wherein wiring segment 62d connects outlets 63d and 63c, wiring segment 62c connects outlets 63b and 63c and wiring segment 62b connects outlets 63a and 63b. Wiring segment 62a connects the 'first' outlet 63a to the PSTN (Public Switched Telephone Network) 61 via a junction box (not shown) and the external wiring part known as 'local loop' or 'subscriber loop'. In each outlet, a standard telephone RJ-11 jack is connected to the wiring 62, allowing telephone units to be connected thereto, using RJ-11 plug. Outlets 63a, 63b, 63c and 63d respectively comprise jacks 64a, 64b, 64c and 64d. Other wiring topologies such as 'star' (a.k.a. 'HomeRun', 'structured wiring'), tree and mixed topologies are also available, and are also suitable.

OFDM Modems 30 and 60 may be connected to and networked over the telephone wiring 62 by connecting to the respective RJ-11 telephone connector 64 in outlet 63, and via cable 74 to the OFDM modem connector 36, marked as 'wiring' connection. A network may include only OFDM modems 30 as shown functionally in FIG. 3, or only OFDM modems 60 as shown functionally in FIG. 6 or any combination thereof. The network 75 is shown to include an OFDM modem 30b connected by a cable 74d to outlet 63d, an OFDM modem 60a connected by a cable 74b to outlet 63b and OFDM modem 30a connected by a cable 74a to outlet 63a. In each case, connection to the outlets is via the respective connectors 64d, 64b and 64a. Computer 66a is shown connected to the OFDM modem 30b via its 'data' port (representing port 33 in FIG. 3), and computer 66b is connected to OFDM modem 60a via its 'data' port (representing port 33 in FIG. 6). The computers 66 represent any data units, preferably connected via a standard wired data interface. The modems 30a and 60a allow a half duplex communication between the computers 66a and 66b over the telephone wiring. Similarly, additional OFDM modem 30a may also support an additional data unit through its 'data' port.

Simultaneously with the data network formed over the telephone line, the standard telephone service is also provided. Telephone set 65a is connected to the wiring 62 (so as to connect to the PSTN 61) via the 'TEL.' Port (port 35 in FIG. 3). Similarly, telephone sets 65c and 65d connect to the PSTN 61 (via the respective outlets 63 and wiring 62) by connecting to OFDM modems 60a and 30a, respectively. Telephone set 65b is directly connected to outlet 63c (via cable 74c and plug/jack 64c). In such a case, the usage of LPF 34 (a.k.a. micro-filter) is recommended in order to avoid interference to and from the other signals using the same telephone wiring as a medium.

In order to enable the computers 66a and 66b to connect to an external network (such as the Internet), a device connected to the external network (either broadband or narrowband) is commonly employed, non-limiting examples including a DOCSIS based cable modem, an ADSL modem, wireless (such as WiMax) and others. Such a device should be connected to the 'data' port of any OFDM modem, hence allowing sharing the external connection to data units connected throughout the building. In one example, an ADSL modem 67 is used. The ADSL modem is shown to connect to the telephone outlet 63a via cable 74e for coupling to the ADSL signal 42 (depicted in FIG. 4), and providing a standard data interface (e.g. USB, 10/100BaseT). This data interface in turn connects to the OFDM modem 30a 'data' port, thus allowing computers 66a and 66b to share the ADSL connection via the formed network. The OFDM modem 30a is likewise connected to the telephone outlet 63a via a cable 74a (together with cable 74e).

While network 75 has been described with regard to 'bus' topology wherein all the modems are connected to the same medium (telephone wiring 62), it is known that better communication performance (e.g. data-rate) may be achieved in point-to-point structure, wherein two modems are connected at the ends of a wiring segment. Such configuration may exist in newly installed infrastructures (e.g. structured wiring in a newly constructed building) or in MDU (Multiple Dwelling Unit), MTU (Multiple Tenant Unit) and MHU (Multiple Hospitality Unit). In all the above, the wiring segments are in 'star' topology, wherein each wiring segment connects a remote site (e.g. apartment) to a center (e.g. basement).

Figure 7:
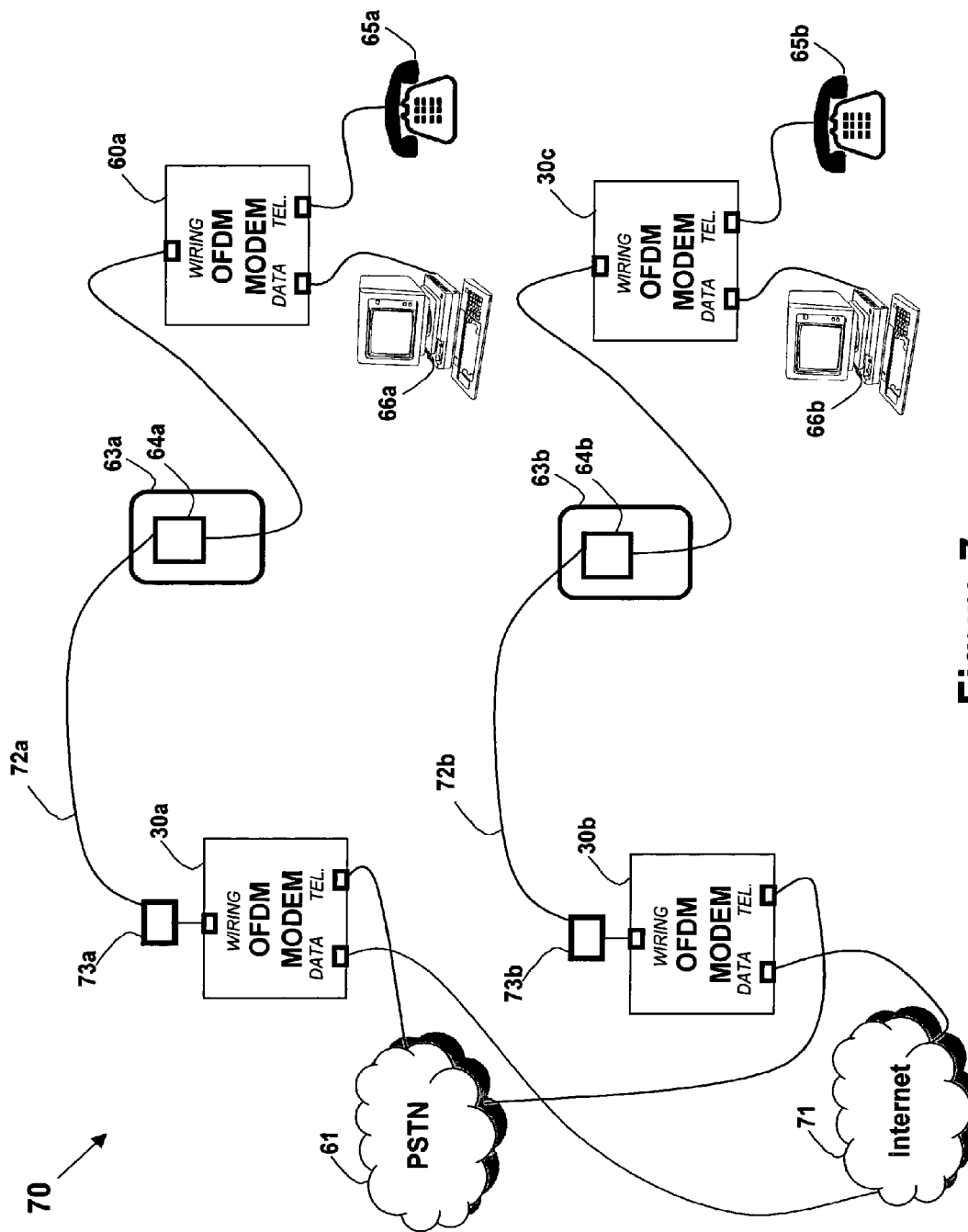
FIG. 7 shows schematically a general functional block diagram of an exemplary network according to the invention.

An application of OFDM modems to such topology is shown as a non-limiting example as network 70 in FIG. 7. The infrastructure of network 70 is described as comprising two wiring segments (each comprising a single pair) 72a and 72b, respectively connected between connection points 73a and 73b (e.g. in junction box) and respective outlets 63a and 63b, allowing telephone connection via the respective connectors 64a and 64b. In order to allow both telephone and data signals over the same wire pair, OFDM modems (either modem 30 or modem 60 types) are connected to each wiring end. OFDM modem 60a connects to wiring segment 72a via outlet 63a, communicating over the wiring segment 72a with OFDM modem 30a connected to the other end of the wiring segment 72a via connection point 73a. Telephone signals are carried over the lower band, allowing telephone set 65a to connect to PSTN 61, simultaneously with the OFDM signal carried over a distinct band and connecting the computer 66a (representing any data unit) to the Internet 71 (via any connection such as ADSL DOCSIS cable modem or wireless). Similarly, OFDM modem 30c connects to wiring segment 72b via outlet 63b, communicating over this pair with OFDM modem 30b connected to the other end via connection point 73b. Telephone signals are carried over the lower band, allowing telephone set 65b to connect to PSTN 61, simultaneously with the OFDM signal carried over a distinct band and connecting the computer 66b (representing any data unit) to the Internet 71 (via any connection such as ADSL DOCSIS cable modem or wireless).

Outlet Enclosed Modem.

Outlets in general (to include LAN structured wiring, electrical power outlets, telephone outlets, and cable television outlets) have traditionally evolved as passive devices being part of the wiring system house infrastructure and solely serving the purpose of providing access to the in-wall wiring. However, there is a trend towards embedding active circuitry in the outlet in order to use them as part of the home/office network, and typically to provide a standard data communication interface. In most cases, the circuits added serve the purpose of adding data interface connectivity to the outlet, added to its basic passive connectivity function.

An outlet supporting both telephony and data interfaces for use with telephone wiring is disclosed in U.S. Pat. No. 6,549, 616 entitled 'Telephone outlet for implementing a local area network over telephone lines and a local area network using such outlets' to Binder. Such outlets are available as part of NetHome™ system from SercoNet Inc. of Southborough, Mass. U.S.A.

Another telephone outlet is described in U.S. Pat. No. 6,216,160 to Dichter, entitled 'Automatically configurable computer network'. An example of home networking over CATV coaxial cables using outlets is described in US Patent Application 2002/0194383 to Cohen et al. entitled: 'Cableran Networking over Coaxial Cables' to Cohen et al. Such outlets are available as part of HomeRAN™ system from TMT Ltd. of Jerusalem, Israel. Outlets for use in conjunction with wiring carrying telephony, data and entertainment signals are disclosed in US Patent Application 2003/0099228 to Alcock entitled 'Local area and multimedia network using radio frequency and coaxial cable'. Outlets for use with combined data and power using powerlines are described in US Patent Application 2003/0062990 to Schaeffer et al. entitled 'Powerline bridge apparatus'. Such power outlets are available as part of PlugLAN™ by Asoka USA Corporation of San Carlos, Calif. USA.

While the active outlets have been described above with regard to networks formed over wiring used for basic services (e.g. telephone, CATV and power), it will be appreciated that the invention can be equally applied to outlets used in networks using dedicated wiring. In such a case, the outlet circuitry is used to provide additional interfaces to an outlet, beyond the basic service of single data connectivity interface. As a non-limiting example, it may be used to provide multiple data interfaces wherein the wiring supports single such data connection. An example of such outlet is the Network Jack™ product family manufactured by 3Com™ of Santa-Clara, Calif., U.S.A. In addition, such outlets are described in U.S. Pat. No. 6,108,331 to Thompson entitled 'Single Medium Wiring Scheme for Multiple Signal Distribution in Building and Access Port Therefor' as well as U.S. Patent Application 2003/0112965 Published Jun. 19, 2003 to McNamara et al. entitled 'Active Wall Outlet'.

While the outlets described above use active circuitry for splitting the data and service signals, passive implementations are also available. An example of such passive outlet is disclosed in WO 02/25920 to Binder entitled 'Telephone communication system and method over local area network wiring'. Such outlets are available as part of the ether-SPLIT™ system from QLynk Communication Inc. of College Station, Tex. USA.

As known in the art, from the data communication (high frequency band) point of view, the cables 74 connected to the outlets 63 in system 75 are known as 'taps'. Cable 74c, terminated in the LPF 34 is considered an 'open tap' or 'bridged tap'. The same goes for cable 74e, terminating the ADSL band, but open for higher frequencies. Cable 74b (as a non-limiting example) is considered a 'terminated tap', since appropriate termination is expected to be part of the OFDM modem 60a. Taps in general and non-terminated taps in particular, are considered a major impairment in any wired communication system. Reflections are generated at the tap points and at the ends of open taps, resulting in a 'notch' pattern in the appropriate frequency. Such characteristics render part of the spectrum non-usable. As such, taps results in lower communication performance, and it is therefore desirable to eliminate taps as much as practical.

Wireless system in general, and WLAN systems in particular are associated with mobile and handheld devices such as PDA (Personal Digital Assistant), cellular phone, remote-controller and laptop computers. Being mobile and man-carried, the space and weight of the wireless components is critical. As such, a lot of resources are allocated to integration and miniaturization efforts in order to make the wireless components as small as possible. Vendors are increasingly focusing on integrating more and more functions into a minimum set of chips and peripherals. Hence, the small dimension featured by the wireless components makes them well suitable to be housed within small enclosures such as outlets.

In one or more embodiments of the present invention, the OFDM modem (partially or completely) is integrated into a telephone outlet. In addition to providing all the advantages described in the aforementioned prior art, such configuration eliminates the tap related impairments, thus improving the communication performance. As a non-limiting example, in the case the OFDM modem functionality is integrated into outlet 63d, the cable 74d is effectively zero in length, hence effectively eliminating the tap existence.

Figure 8:
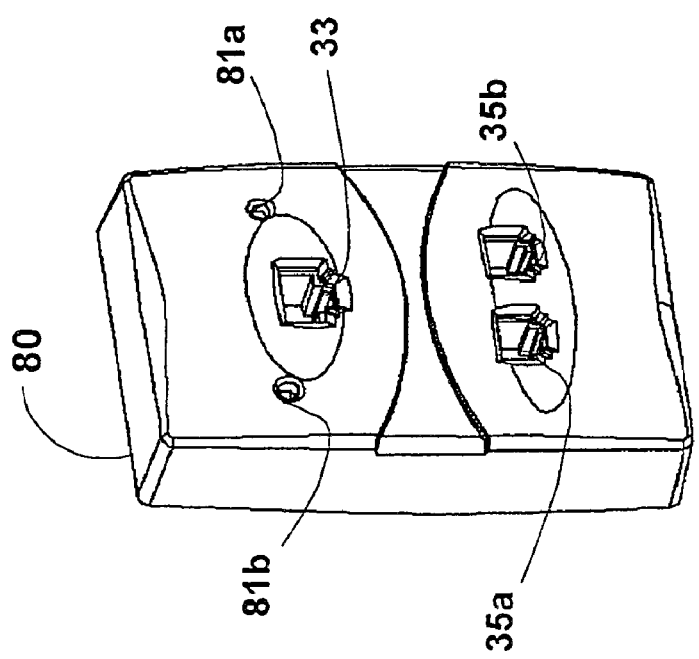
FIG. 8 shows schematically a view of an exemplary telephone outlet according to the invention.

A pictorial view of such outlet integrating OFDM modem functionality is shown as outlet 80 in FIG. 8. The telephone wiring connector 36 is in the back of the outlet (facing the wall), for connecting to the wiring in the common way of connecting wiring to a telephone outlet. The outlet 80 front (facing the room) comprises connector 33, shown as RJ-45 for 10/100BaseT interface. A telephone connector 35a is shown as standard telephone connector RJ-11 jack. A second connector 35b may also be used for allowing connection to multiple telephone sets. The outlet 80 also comprises indicators 81a and 81b (LEDs) that may be used to indicate proper operation such as power availability, communication status (such as LINK signal in Ethernet systems), communication performance and others.

The above-described outlet 80 is a complete and self-contained device. As such, it can be easily installed in new houses instead of regular passive simple outlets. However, such solutions are not appropriate in the case of retrofitting existing wiring systems. In most cases, any such modification will require dismantling the existing outlets and installing the new ones having the improved features. Such activity is cumbersome, expensive and will often require professional skill. Furthermore, owing to safety aspects involved while handling hazardous voltages (such as in the powerlines and telephone lines), local regulations may require only certified personnel to handle the wiring, making it expensive and militating against a do-it-yourself approach.

Furthermore, as technology and circumstances change in time, a need to upgrade, modify or change the outlet functionalities, features and characteristics may arise. For example, the data interface may need to be upgraded to interconnect with new standards. In another example, the circuitry may need to be upgraded to support higher bandwidth. Similarly, management and Quality of Service (QoS) functionalities may need to be either introduced or upgraded. In yet another example, additional functionalities and interfaces may need to be added. Using complete self-contained outlets as a substitute to the existing ones also introduces the disadvantages described above.

One approach to adding functionality to existing outlets is by using a plug-in module. Such plug-in modules for use with powerline communication are described in US Patent Application 2002/0039388 to Smart et al. entitled 'High data-rate powerline network system and method', US Patent Application 2002/0060617 to Walbeck et al. entitled 'Modular power line network adaptor' and also in US Patent Application 2003/0062990 to Schaeffer, JR et al. entitled 'Powerline bridge apparatus'. Such a module using HomePlug™ technology are available from multiple sources such as part of PlugLink™ products by Asoka USA Corporation of San Carlos, Calif., USA. However, such plug-in modules are known only with regards to power outlets, and are not available for telephone or CATV outlets.

Figure 9:
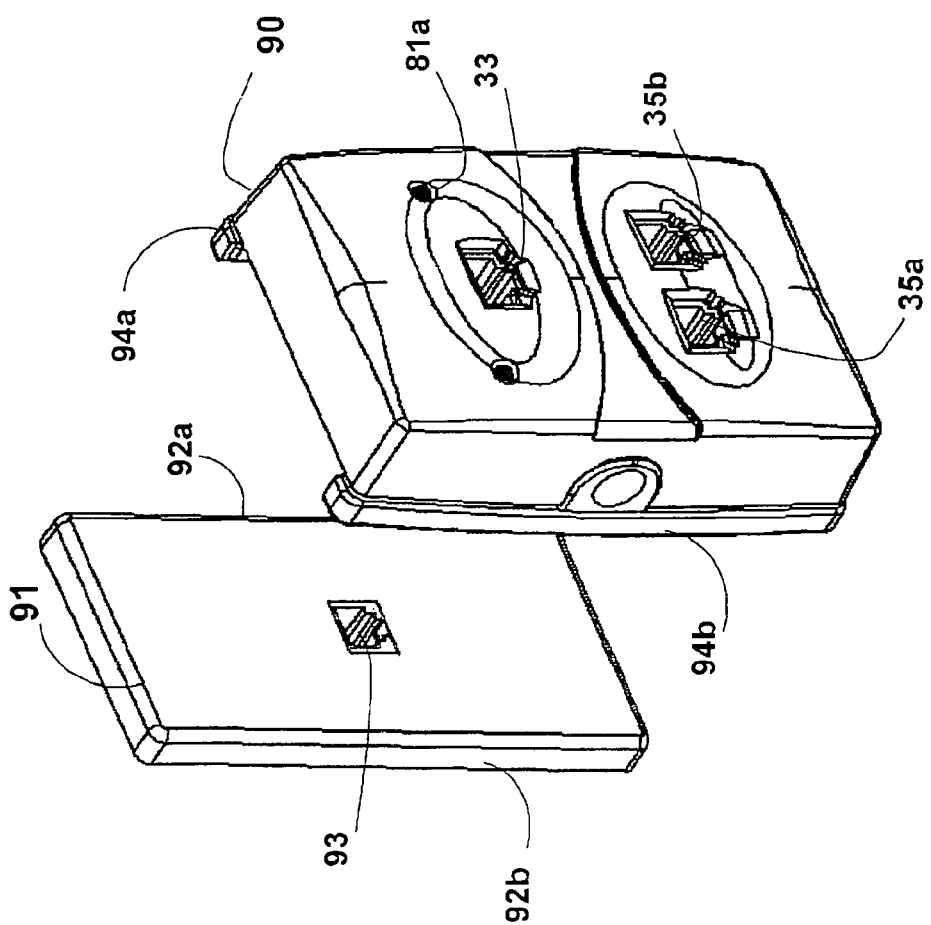
FIG. 9 shows schematically a view of an exemplary telephone module according to the invention.

A plug-in module according to one or more embodiments of the present invention is shown as module 90 in FIG. 9. The module 90 is based on the outlet 80 described above. However, in contrast to being an outlet, the module 90 has an RJ-11 plug that plugs in the RJ-11 jack 93 of the telephone outlet 91, the latter thus not requiring replacement or modification. In order to allow mechanical securing of the connection, the module 90 comprises two sliding sides 94a and 94b, which are latched and pressed against the outlet 91 surfaces 92a and 92b respectively. In this way, the module 90 is both electrically connected to the wiring and mechanically attached to outlet 91, while not requiring any specific skills or tools. The POTS service is fully retained through the telephone connectors 35a and 35b.

Wireless Port.

Both OFDM modems 30 and 60 described above offer two wired ports, namely the data unit port 33 and the telephone wiring port 36, and function to convert signals between those ports. Adding a wireless port will enable the OFDM modems also to network with data units over a non-wired medium.

Figure 10:
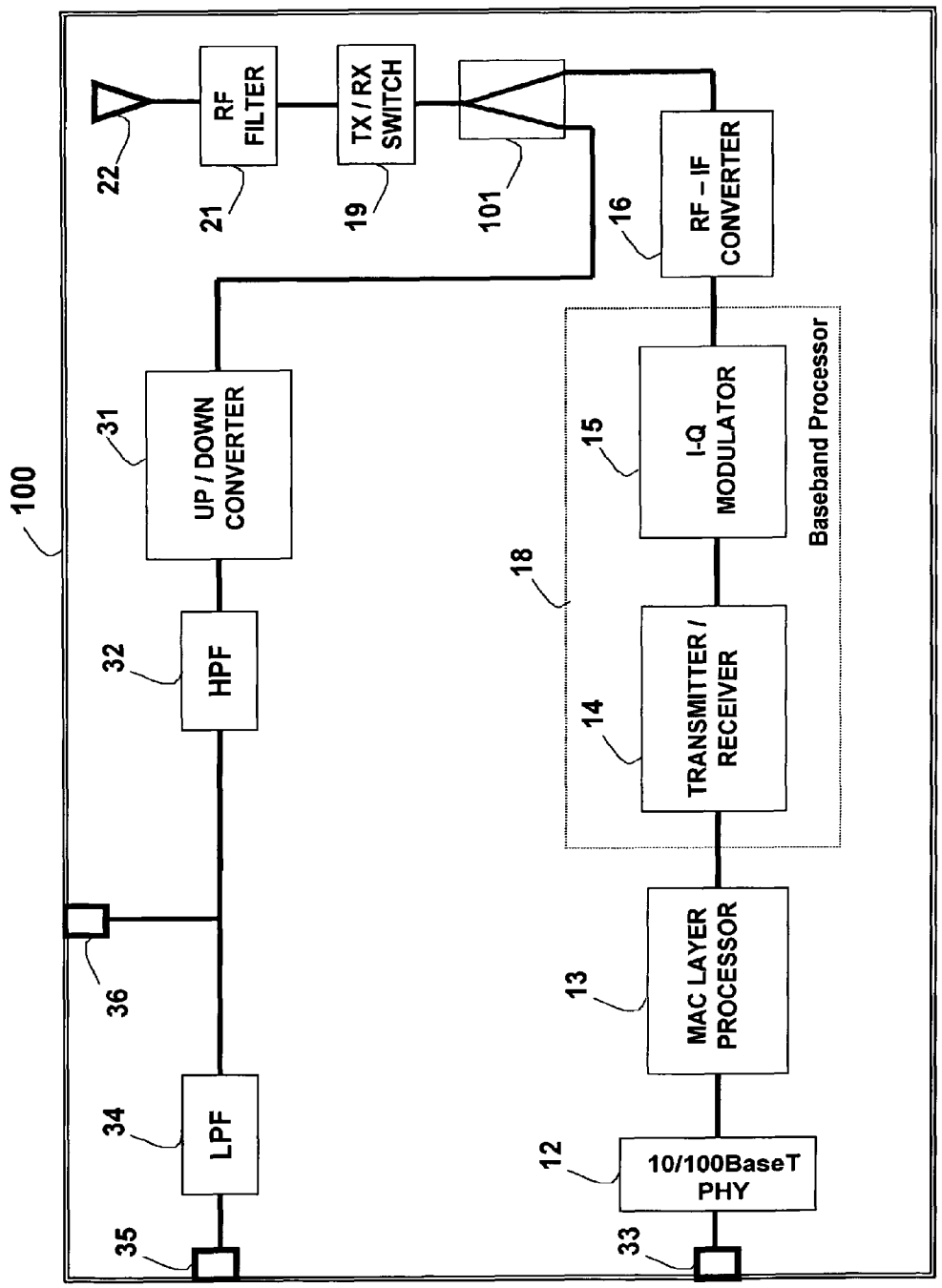
FIG. 10 shows schematically a general functional block diagram of an exemplary OFDM modem according to the invention.

Such an OFDM modem 100 comprising an antenna 22 as a wireless port is shown in FIG. 10. Generally, such a modem 100 can be considered as a combination of a WLAN unit 10 and OFDM modem 30 respectively as described above in relation to FIGS. 1 and 3. Modem 100 is shown to include the full WLAN unit 10 functions, and as such may function as WLAN unit 10. However, the RF signal is coupled in between the RF-IF converter 16 and TX/RX Switch 19 by a sharing device 101. The RF signal is thus also coupled to the telephone wiring connector 36 via the Up/Down Converter 31 and the HPF 32, similar to the description above relating to OFDM modem 30. Similarly, a telephone set may be coupled via connector 35 and LPF 34.

The sharing device 101 is a three ports device and functions to share the three RF signals, such that an RF signal received in any one of the ports is replicated and shared by the other two ports. One RF signal relates to the wireless radio communication via the antenna 22, a second signal relates to the telephone wiring carried signal via connector 36 and the third RF signal is associated with the data port 33.

In such a configuration, the OFDM modem 100 communicates via three ports: Wireless port via antenna 22, wired data unit port via connector 33 and wired telephone wiring connector 36. A data packet (such as Ethernet packet) received from the data unit connected via port 33 will be converted to an OFDM RF signal at the RF-IF Converter 16 port, and then fed via sharing device 101 to both the telephone wiring after being down converted to a baseband signal by the Up/Down Converter 31 and through HPF 32 (as described above for modem 30), and in parallel (via sharing device 101) to the antenna 22 to be transmitted over the air. Similarly, an OFDM RF signal received in the antenna 22 is fed via the sharing device 101 to both the telephone wiring port 36 in analog baseband form and data unit port 33 as digital packets. Baseband signals received via the telephone wiring port will be converted to RF and then transmitted to the air by the antenna 22 in parallel to being down frequency converted and encoded into a packet in digital form in port 33. In some cases, an RF signal may be received from both the antenna 22 and the telephone wiring (via port 36). Since wireless systems are able to handle the through-air multi-path phenomenon, the signal received via the telephone wiring channel should be appreciated as another signal path, hence being handled by the baseband processor 18.

Figure 10A:
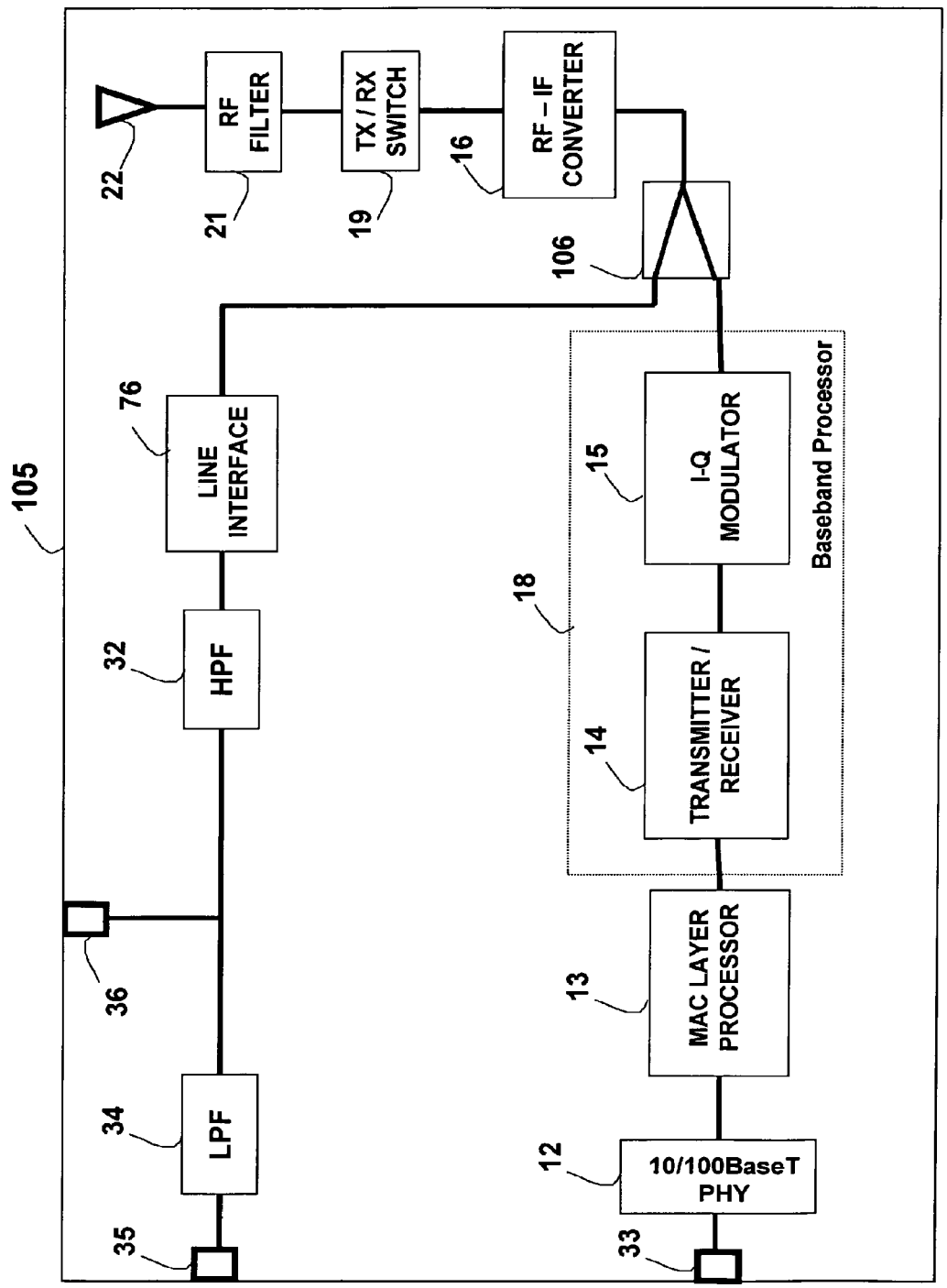
FIG. 10a shows schematically a general functional block diagram of an exemplary OFDM modem according to the invention.

The three ports modem 100 is shown to share the three RF signals by sharing device 101. In one or more embodiments of the present invention, the sharing function is performed in the baseband (or IF) frequency spectrum. Such a modem 105 is shown in FIG. 10a. Similar to modem 100, three ports are supported, two wired and one wireless. However, in contrast to modem 100, the sharing device 106 shares three baseband signals: an antenna 22 coupled signal, via the RF-IF Converter 16, telephone wiring signal via line interface 76 and data unit related signal via the baseband processor 18. One advantage of such configuration is the use of a single Up/Down Converter 16, rather than the two converters (16 and 31) used in modem 100 configuration.

Figure 11:
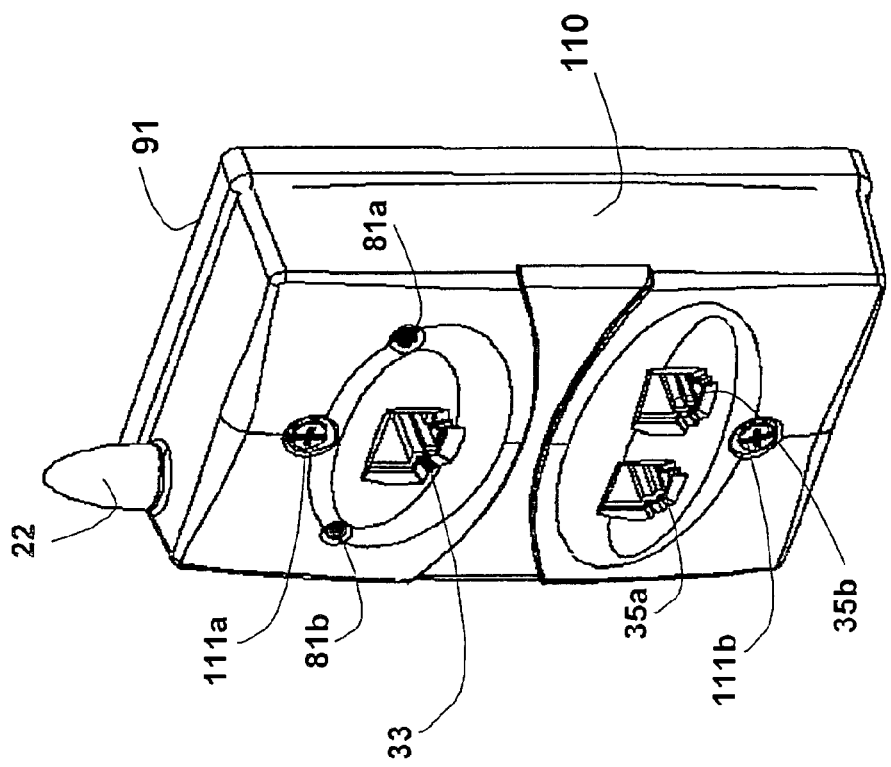
FIG. 11 shows schematically a view of an exemplary telephone module according to the invention.

Similar to the above discussion relating to OFDM modems 30 and 60, wireless-port equipped modems 100 and 105 may be equally enclosed within a telephone outlet or snap-on module. Such a snap-on module 110 attached to a telephone outlet 91 is shown in FIG. 11. Module 110 is similar to module 90 shown in FIG. 9, but in contrast attaches to the outlet using screws 111a and 111b rather than by snap-fit connection. It should be noted that other mechanical attachment means could be equally employed. In addition to the wired ports shown for module 90, an antenna 22 is shown, serving as additional over-the-air wireless port.

Figure 12:
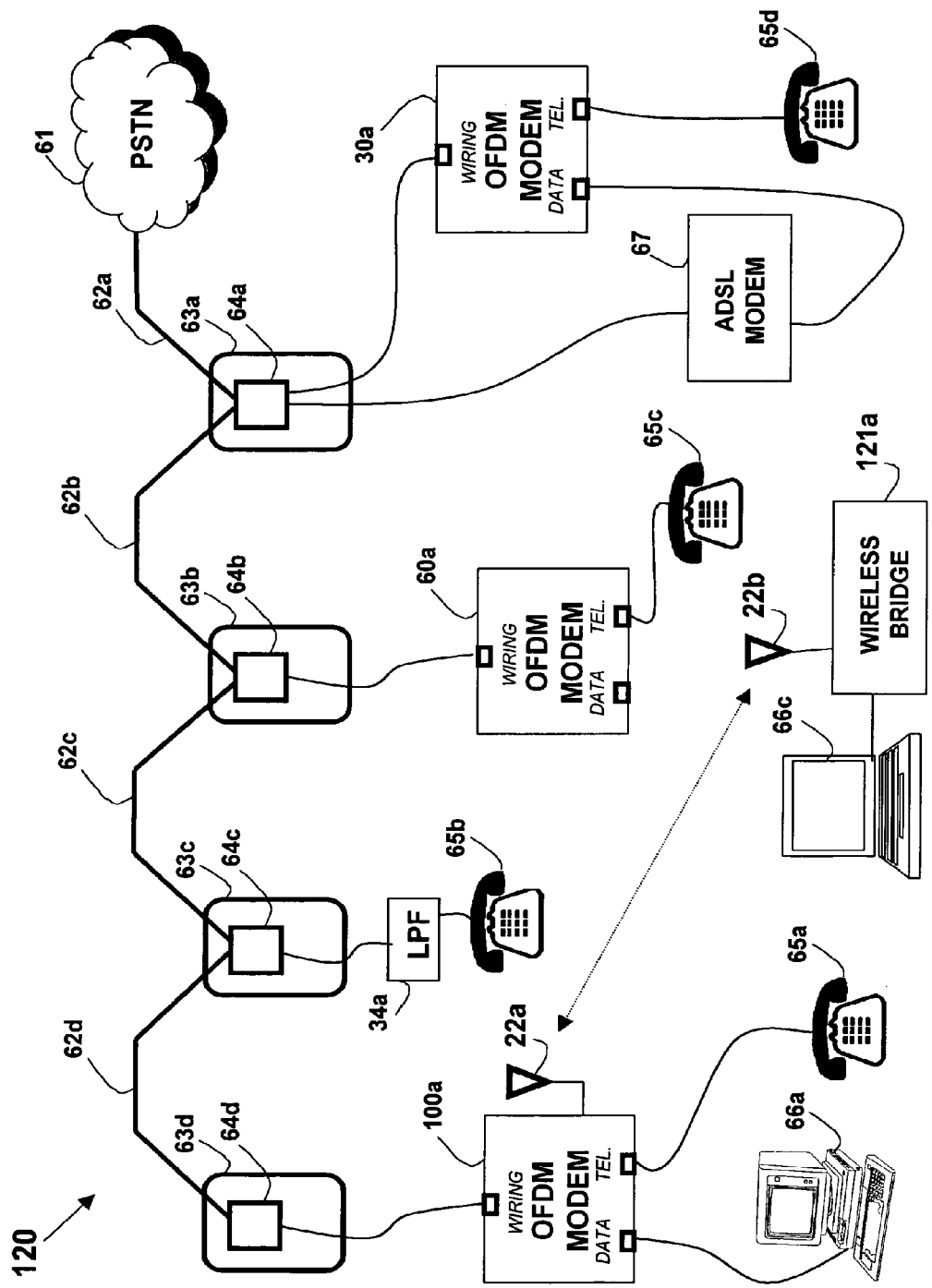
FIG. 12 shows schematically a general functional block diagram of an exemplary network according to the invention.

A network 120 utilizing a wireless port equipped OFDM modem 100 is shown in FIG. 12. OFDM modem 105 may be equally employed. The network 120 is based on network 75 shown in FIG. 6b, wherein OFDM modem 100a substitutes OFDM modem 30b, hence introducing a wireless port 22a to the network. Computer 66a and telephone unit 65a connect to the OFDM modem 100a in a similar manner as before. The additional port 22a allows for a laptop computer 66c to be connected to the wireless bridge 121a comprising an antenna 22b. Similarly, the wireless client functionality 121a may be built in the computer 66c. A wireless link according to standard IEEE802.11g is established between the bridge 121a and the modem 100a, hence enabling the computer 66c to network with the other data units connected to the telephone wiring 62, as well as to computer 66a.

While a single modem 100 or 105 is part of network 120, it should be appreciated that multiple such modems may be used, each covering a different area in the premises, hence enlarging the actual wireless coverage. Furthermore, such network 120 offers the user the flexibility of adding data units either through wiring (by connecting to the data ports of the OFDM modems) or wirelessly (via the wireless port).

Figure 13:
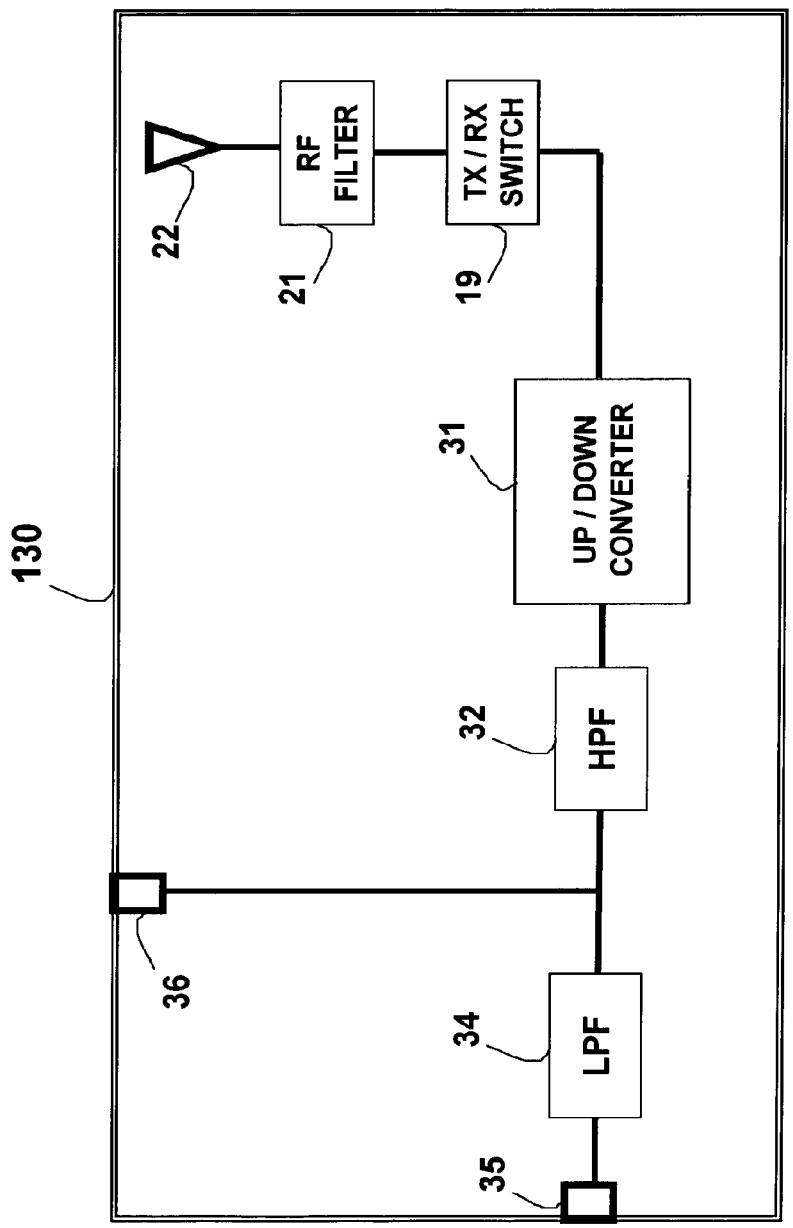
FIG. 13 shows schematically a general functional block diagram of an exemplary OFDM modem according to the invention.

In some cases, only wireless ports may be required, thus tethered data unit connection may be obviated. According to one or more embodiments of the present invention, a wireless adaptor 130 supporting only wireless port is shown in FIG. 13. The data unit port 33 associated functions described for modem 100 in FIG. 10 (such as baseband processor 18, MAC layer processor 13 and PHY 12) are omitted. The receiving path comprises the antenna 22, RF Filter 21 and TX/RX Switch 19. The received RF signal is then frequency down shifted by Up/Down converter 31, and fed to the telephone wiring via connector 36 and HPF 32. Similarly, any OFDM signal carried by the telephone wiring is received and up converted to RF, and then feeds the antenna 22. A telephone set may be connected to the telephone wiring via connector 35 and LPF 34.

Figure 14:
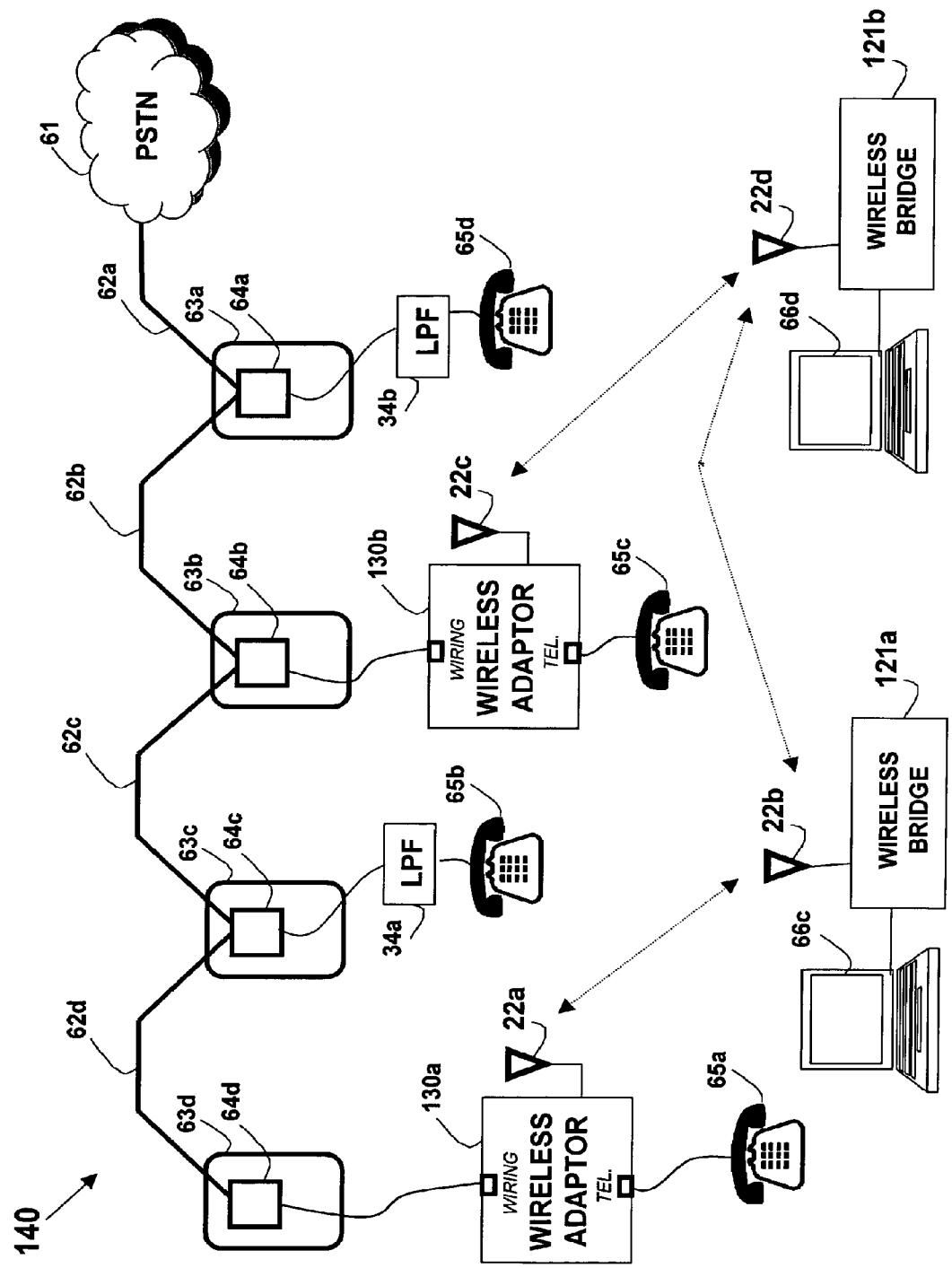
FIG. 14 shows schematically a general functional block diagram of an exemplary network according to the invention.

A network 140 employing the wireless adaptor 130 is shown in FIG. 14. Wireless adaptors 130a and 13b are respectively connected to outlets 63d and 63b, and respectively employ antennas 22a and 22c. Computer 66c is wirelessly coupled to the telephone wiring 62 via the wireless bridge 121a and antenna 22b, communicating with adaptor 130a via its antenna 22a. Similarly, computer 66d is wirelessly coupled to the telephone wiring 62 via the wireless bridge 121b and antenna 22d, communicating with adaptor 130b via its antenna 22c. In this configuration, the computers 66c and 66d communicate over the telephone wiring 62 via the respective adaptors 130. In such a system, the telephone wiring 62 and the adaptors 130 serve as a repeater, thus allowing communication between units, which cannot directly wirelessly communicate. The lower frequency band of the wiring is used simultaneously to carry telephone signals between the PSTN 61 and the telephones 65a, 65b, 65c and 65d. Telephone sets 65a and 65c respectively connect via adaptors 130a and 130b. Telephone sets 65b and 65d connect to the wiring 62 via LPFs 34a and 34b, respectively.

Antennas 22b and 22d may be sufficiently close to enable direct wireless communication between bridges 121a and 121b. In such case, in addition to the path (or multiple paths) formed through the air, a telephone wiring path is added. As a non-limiting example, bridge 22d may receive signals transmitted by bridge 121a via the air. In addition, the transmitted signal is received by adaptor 130a (via antenna 22a), and converted to baseband and carried over the telephone wiring segments 62d and 62c. The signal is then extracted by adaptor 130b, up frequency shifted and transmitted through the air via antenna 22c to the bridge 121b, hence forming an additional path. Since most wireless technologies and IEEE802.11g in particular are well equipped to handle multi-path, this phenomenon is not expected to degrade the communication performance.

While the invention has been described with regard to 'bus' topology telephone wiring, it will be appreciated that wireless-port equipped modems and adaptors may equally be used in point to point topology, 'star' topology or any combination thereof.

While the invention has been described with regard to a single specific channel frequency shifted to a specific band for use over the telephone wiring, it will be appreciated that the invention equally applies to any channel that can be used (as shown in graph 20) and may be located at any usable frequency band over the telephone wiring (not limited to the example shown as curve 43 of graph 40). Furthermore, several products are currently available using multiple channels in order to improve data rate performance, as well as using other techniques to improve throughput such as compression. Such techniques are sometimes known as 'Turbo-G', 'Dynamic Turbo', 'Super G' and other brands. Such a solution may be equally employed in one or more embodiments of the invention, using larger baseband signal bandwidth. Exemplary techniques to improve effective data rate are described in Atheros Communication White Paper entitled "*Super G Maximizing Wireless Performance*", which is incorporated herein by reference.

While the invention has been described with regard to modems and adaptors supporting telephone port 35, it will be appreciated that the invention equally applies to the case wherein the telephone wiring is not carrying a telephone (POTS) signal. In such a case, telephone connector 35, LPF 34 may be omitted, and HPF 32 may be omitted and bypassed. Furthermore, such configuration may apply to any type of wiring dedicated for carrying the baseband signal, not limited to telephone wiring of any kind.

In one or more embodiments according to the present invention, other utility wiring (not limited to telephone oriented wiring) is used, carrying a service signal. For example, powerlines may be used to carry both the AC power signal and the OFDM signal according to one or more embodiments according to the present invention. In such a case, the HPF 32 should be substituted with HPF filtering out the low frequency band (i.e. 60 Hz in North America and 50 Hz in Europe) carrying the AC signal and its associated noises. Similarly, in the case wherein the modem is required also to provide AC power connection, the telephone connector 35 should be substituted with a two or three prongs power jack suitable for connecting powered appliances, and the telephone-oriented LPF 34 should be substituted by a LPF passing the 50/60 Hz AC signal. Furthermore, similar to the above discussion about housing the modem within a telephone outlet and telephone outlet snap-on module, the powerline OFDM modem may be equally enclosed within an AC power outlet and snap-on module respectively, with the warranted modifications.

In one or more embodiments according to the present invention, the OFDM baseband signal is carried over CATV cabling, carrying a CATV service signal. In one or more embodiments, the baseband signal may be employed over a band not used for carrying CATV signals (e.g. over 750 MHz in some implementations). The CATV analog video channels are usually carried each occupying a 6 MHz wide band. In such a case, an allocation of four adjacent channels will result in a total bandwidth of 6*4=24 MHz, which may contain the 22 MHz wide OFDM baseband signal. In such case, the Up/Down Converter 31 used should shift the band to the allocated bandwidth, for example by tuning the local oscillator 54 frequency to the required value. Similarly, The HPF 32 should be substituted with a BPF passing the allocated 24 MHz, and the LPF 34 should be substituted with a BSP (Band Stop Filter) blocking the OFDM signal and passing the CATV channels, to be coupled to via RF connector (BNC or F-Type) substituting for the telephone connector 35.

Figure 15:
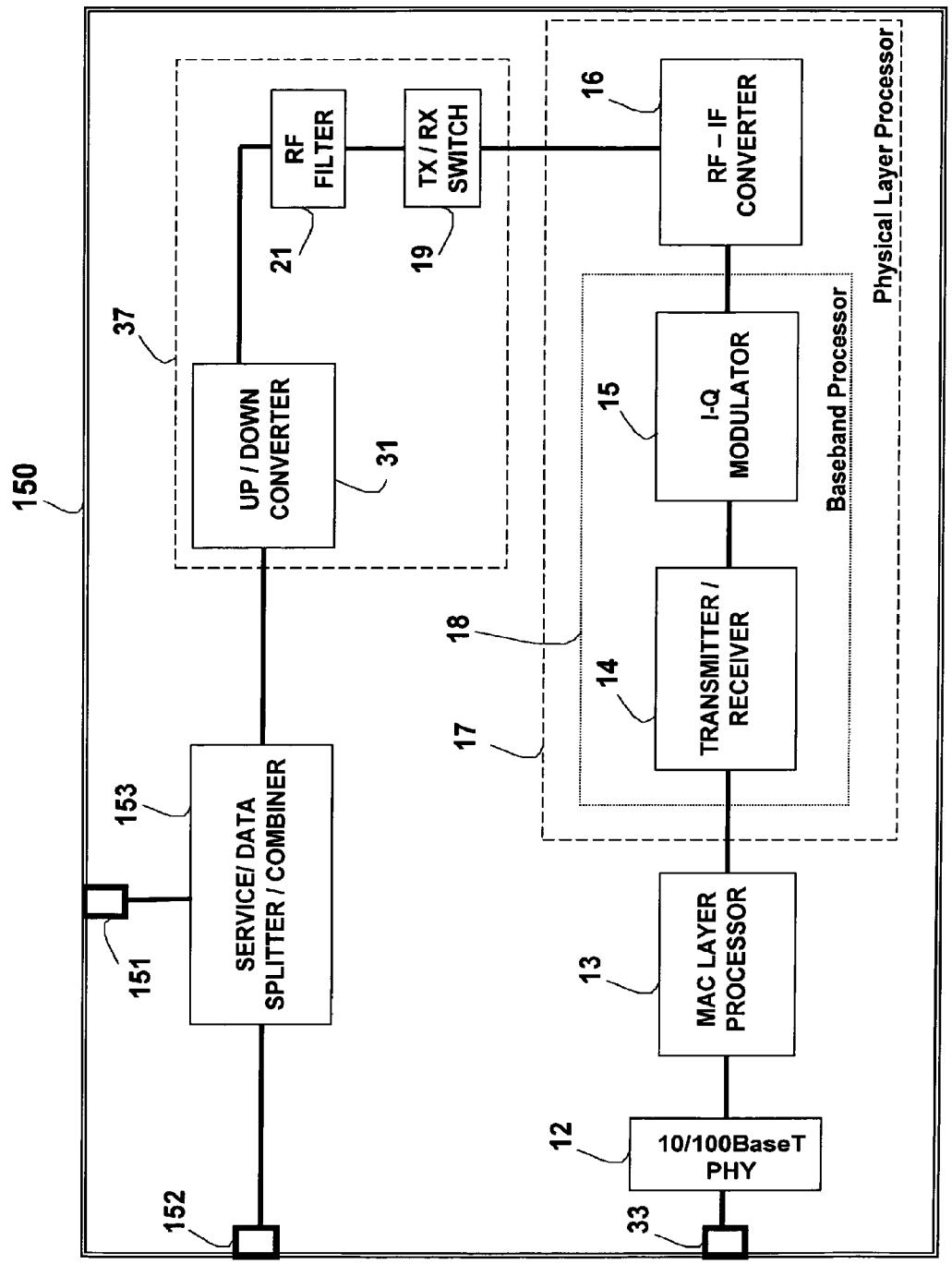
FIG. 15 shows schematically a general functional block diagram of an exemplary OFDM modem according to the invention.

A non-limiting example of generalizing OFDM modem 30 to be used with any type of utility wiring is shown as modem 150 in FIG. 15. Connector 151 is connectable to appropriate utility wiring, and represents a dedicated specific applicable connector, such as telephone connector 36 (e.g. RJ-11 plug) in the case where the utility wiring is telephone wiring, or an RF connector in the case of CATV cabling and AC power plug in the case of powerlines. Similarly, a service connector 152 represents the appropriate service signal connector such as telephone connector 35, RF connector and AC power jack when used with telephone, CATV and AC power wiring, respectively. Service/Data Splitter/Combiner 153 functions to pass the service signal to the service connector 152, to couple the OFDM baseband signal to the Up/Down Converter block 37 and to avoid interference between both signals. In the case of telephony, the functionality of the Splitter/Combiner 153 is provided by the LPF 34 and HPF 32. Similarly, LPF and HPF are used in powerline applications, for coupling/stopping the AC power signal. For use over CATV wiring, BPF (Band Pass Filter) and BSP (Band Stop Filter) are used as described above.

Powering.

In most of the embodiments according to the present invention, the OFDM modems (or wireless adaptor) include active components (such as Up/Down converter 31), and as such need to be powered. Three non-limiting powering schemes are described hereinafter including local feeding, power over wiring and via the interface module. The powering schemes apply to the modem/adaptor being a stand-alone enclosure, housed within an outlet, enclosed within a snap-on outlet module or as part of a data unit.

Local Feeding.

In this implementation the module is connected to an external power source for feeding its active components. A common small AC/DC converter may be connected to the modem/adaptor via a dedicated power connection.

A power adaptor may be used in the modem/adaptor, for adapting the external power to the internal needs. Such an adaptor may include voltage conversion (such as DC to DC converter) in order to adapt to specific voltages required, protection circuits (such as fuse or current limiting), regulation and noise filtration, as well as other functionality as known in the art.

Power Over Wiring.

In one or more embodiments according to the present invention, the OFDM modem (or the wireless adaptor) is fed by power carried over the wiring to which the module is connected. The power may be carried over separated conductors. In this case, the same wiring connector (such as 36 or 151) may be used to connect to the power carrying conductors using separated pins. Alternatively, an additional power dedicated connector may be used.

In one or more preferred embodiments, the power is carried simultaneously over the wiring carrying the data network signals and/or the basic service signal. The implementation of such a mechanism is trivial when the basic service is AC power. In such a case the power is extracted from the AC power signal carried, commonly via AC/DC converter and LPF filter.

Similarly, a recent technique known as Power over Ethernet (PoE) (a.k.a. Power over LAN) and standardized under IEEE802.3af, also explained in U.S. Pat. No. 6,473,609 to Lehr et al. titled: "Structure Cabling System", describes a method to carry power over LAN wiring, using the phantom mechanism. Such technology, as well as others, may be used to provide power to any of the modems/adaptors described above, in the case where appropriate cabling (such as CAT. 5) is used as the wired medium. As a non-limiting example, in the case of using a different spectrum for the power signal, a filter should be used. In the case of phantom type of feeding, two transformers are required as known in the art.

Recent techniques developed allow for carrying simultaneously power and basic service (and data) over the same wiring infrastructure. U.S. patent publication 2002/0003873 to Rabenko et al. titled: "System and method for providing power over a home phone line network" teaches carrying AC power over telephone wiring carrying both telephony and data, by using a part of the spectrum not used by the other signals. Such a technique may be used for powering a modem or adaptor according to the current invention. As a non-limiting example, AC power using a sine wave power signal of 50 KHz may be used. As shown in graph 40, a 50 KHz signal is in a non-allocated frequency band, and hence may be used for power distribution with minimum or no interference to the other signals carried over the same telephone wire pair.

In most prior-art systems involving carrying a power over a non-power dedicated wiring (e.g. powerlines), the amount of power that can be carried is limited either due to safety regulations and limitations, ensuring minimum interference with the other signals carried over the same wires or due to the power dissipation in the wires. For example, power carried over telephone lines may not exceed 60VDC due to safety limitations, and power carried over coaxial wiring (e.g. CATV) may degrade its signal carrying characteristics.

Wireless system in general, and WLAN systems in particular are associated with mobile and handheld devices such as PDA (Personal Digital Assistant), cellular phone, remote-controller and laptop computers. Being battery operated, the power consumption of the wireless components is critical. As such, a lot of resources are allocated to make the wireless components consume very low power, and the power consumption of any wireless components is considered as one of its main features. This approach is described for example in Texas Instruments White Paper entitled "Low Power Advantage of 802.11a/g vs. 802.11b" which is incorporated herein by reference. Hence, the low power feature of the wireless components makes them well suitable to be used in any power over wiring scheme, and also in any non-local feeding scenarios.

An additional advantage of carrying power over the same wires carrying the OFDM signal relates to the superior characteristics of the OFDM signal. Known single carrier modulations use the whole spectrum for the whole data rates (single 'bin' approach), and as such are greatly susceptible to both white noise and single frequency noise. In contrast, OFDM uses multiple 'bins', each carrying part of the data, and hence is less impaired by either white or narrowband noise. Power supplies are known to be noisy, and in particular at specific frequencies, such as harmonies of the PWM frequency (in the case of PWM based supply). Furthermore, the wires connecting the wired medium to the power supply and to the loads also serve as antennas and receive noise from the environment. Since the OFDM is much more robust, the effects described are less severe, allowing better performance, and obviating the need for complex and expensive filters.

Furthermore, since the networks described above are used to serve wireless clients (STAs) which are battery operated and thus are operative even in the case of power outage, carrying power over the wiring allows for continuing network operation in such a case. The power is typically sourced from a central back-up power source (e.g. UPS—Uninterruptible Power Supply), and allows continuous operation of the network even in the case of power outage via the wiring medium.

Figure 16:
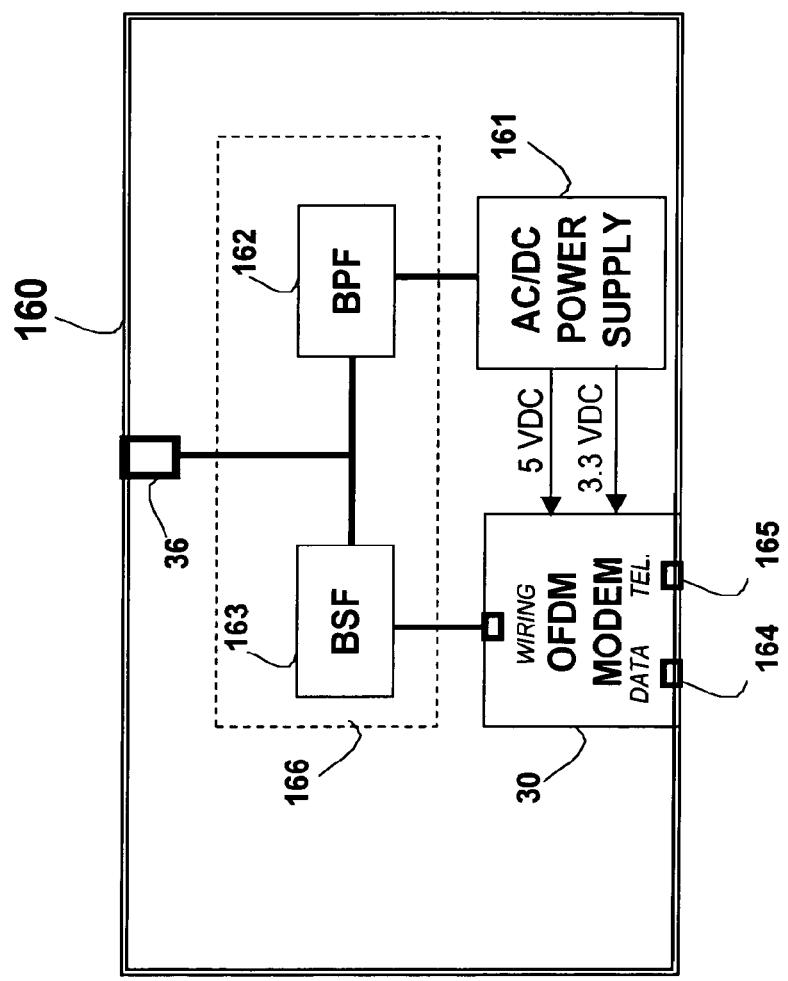
FIG. 16 shows schematically a general functional block diagram of an exemplary OFDM modem according to the invention.

A non-limiting example of an OFDM modem 160 capable of being power fed via the telephone wiring is shown in FIG. 16. OFDM modem 160 includes modem 30 (shown functionally in FIG. 3) and added power extraction and feeding functionalities. OFDM modem 160 connects to the telephone wiring via telephone connector 36, in a way similar to modem 30. A BPF 162, optimized to pass only the 50 KHz power signal, extracts the power signal and feeds AC/DC Power Supply 161, which converts to various DC levels usually required by the OFDM modem 30, such as 5 and 3.3 VDC. The non-power related signals (telephony, ADSL and OFDM baseband) are passed through BSF (Band Stop Filter) 163 (which may implement 50 KHz notch filter, for example) and to the wiring port of OFDM modem 30. The data and telephone ports of the OFDM modem 30 shown as 33 and 35 in FIG. 3 are represented as modem 160 data port 164 and telephone port 165, respectively. Hence, OFDM modem 160 implements all OFDM modem 30 functions, added to the capability of being powered by a power signal carried over the telephone wiring.

The BPF 162 and BSF 163 constitute the power/signal splitter/combiner 166. In the case wherein the power is carried in any other way, this function block 166 should be accordingly modified to split/combine the power and other signals carried over the wiring.

Figure 17:
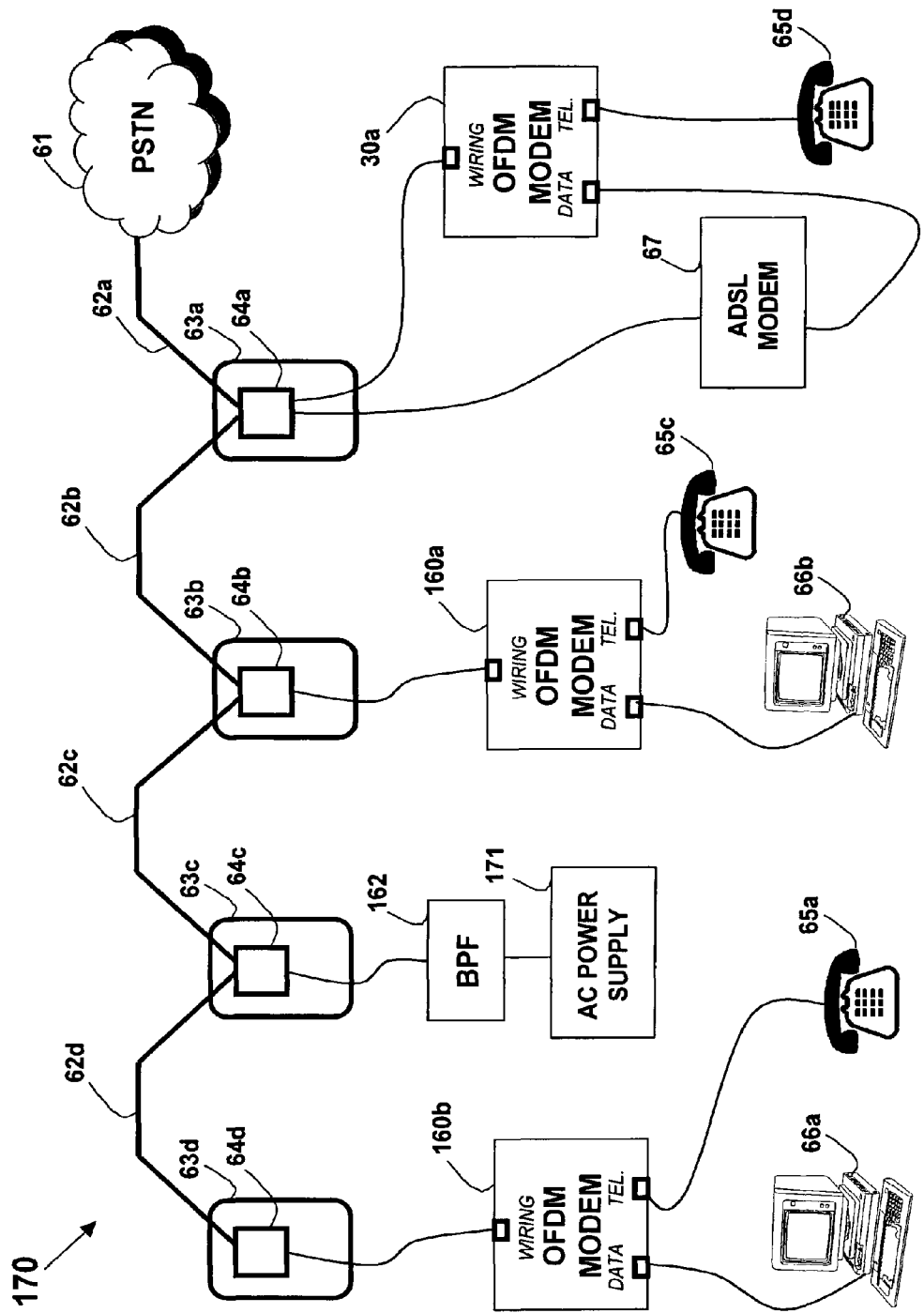
FIG. 17 shows schematically a general functional block diagram of an exemplary network according to the invention.

A network 170 employing AC power over telephone wiring is shown in FIG. 17, based on network 75 described above with reference to FIG. 6b. OFDM modems 30b and 60a of network 75 are respectively substituted with telephone wiring AC powered modems 160b and 160a, including the same functionalities added to the capability of being powered via the telephone lines. The 50 KHz power signal is fed into the wiring via the 50 KHz AC power supply 171, coupled to the telephone wiring 62 via connector 64c of outlet 63c, through a BPF 162 to avoid interference with the other signals carried over the same wiring 62. OFDM modem 30a is used connected to outlet 63a, hence using local powering.

Powering Via Connected Appliance.

As explained above, several data interface standards also carry power over the interface. As a non-limiting example, in the case where the module is connected to USB host unit, the USB interface may feed the module. The same applies when the data port 33 is an Ethernet port implementing PoE technology as described above.

While the invention has been described with regard to a single power source, it will be appreciated that the invention equally applies to the case wherein multiple power sources are used either for redundancy or load sharing.

General.

While the invention has been described with regard to the configuration wherein OFDM signal is carried over telephone wiring (or any other utility or dedicated wiring LAN), it will be appreciated that the invention equally applies to any other spread spectrum signaling (using either DSSS or FHSS). As a non-limiting example, any multi-carrier modulation technique may be used such as DMT (Discrete MultiTone) and CDMA (Code Division Multiple Access). The term 'OFDM modem' used herein is to be considered as an example only, and not as limited to solely using OFDM based signal.

While the invention has been exampled above with regard to using standard IEEE 802.11g technology, signals and components, it will be appreciated that the invention equally applies to any other wireless based technology, using either single or multi carrier signals for implementing either spread spectrum or narrowband, using either unlicensed bands (such as ISM) or licensed spectrum. Such technology may be part of the IEEE 802.11 (such as IEEE 802.11b or IEEE 802.11a), ETSI HiperLAN/2 or any technology used for WLAN, home networking or PAN (Personal Area Network). One non-limiting example is using IEEE 802.11b based on CCK (Complementary Code Keying). Other non-limiting examples are BlueTooth™, ZigBee, UWB and HomeRF™. Furthermore, WAN (Wide Area Network) and other wireless technologies may be equally used, such as cellular technologies (e.g. GSM, GPRS, 2.5G, 3G, UMTS, DCS, PCS and CDMA) and Local Loop oriented technologies (WLL—Wireless Local Loop) such as WiMax, WCDMA and other Fixed Wireless technologies, including microwave based. Similarly, satellite based technologies and components may be equally used. While the technologies mentioned above are all standards-based, proprietary and non-standards technologies may be equally used according to present invention. Furthermore, the invention may equally apply to using technologies and components used in non-radio based through-the-air wireless systems such light (e.g. infrared) or audio (e.g. ultrasonic) based communication systems.

While the invention has been described with regard to the configuration wherein a single wireless oriented signal is carried over the wiring medium (such as utility or dedicated wiring LAN), it will be appreciated that the invention equally applies to the case wherein multiple such signal are carried using FDM. For example, additional IEEE802.11g signal may be added to graph 40, occupying the frequency band of 32-54 Mb/s, hence not overlapping the signals shown. Furthermore, different such signals may be combined, and thus not limited to the same wireless oriented signal.

While the invention has been described with regard to networks using the same wireless technology (such as IEEE802.11g) by all modems connected to the wired medium, it will be appreciated that the invention equally applies to other embodiments wherein different but interoperable signals are employed.

While the invention has been described with regard to embodiments using a complete wireless solution based on existing components, including wireless MAC 13b, baseband processor 18 and converter 16, it will be appreciated that the invention equally applies to other embodiments wherein one or more of theses components are used. As a non-limiting example, the MAC 13b may be substituted with a wired-dedicated MAC, still employing all physical layer components. Similarly, other physical layer components may be used, still using the powerful wireless MAC 13b. Furthermore, while the wireless signal, either as baseband, IF or RF form, has been described as only being frequency shifted, additional processing may also apply to the standard wireless signals and components, such as amplitude/level handling such as amplification and attenuation and frequency handling such as filtering. Such processing may be warranted in order to better adapt to the wired medium, improve reliability or reduce costs.

While the invention has been described with regard to wireless signals and systems carrying digital data, it will be appreciated that the invention equally applies to other embodiments wherein the wireless signals (and system) are used to carry analog signals. One non-limiting example involves cordless telephony. Cordless telephones are known to carry telephone (and control) signals over the air using ISM bands. Applying the invention allows for carrying the signals over any wired medium in general and over a utility wiring in particular. In the case of carrying the signals over telephone wiring, the above advantages are apparent, such as enlarging the coverage. Furthermore, such configuration may allow carrying multiple telephone signals over a single telephone pair.

Those of skill in the art will understand that the various illustrative logical blocks, modules and circuits described in connection with the embodiments disclosed herein may be implemented in any number of ways including electronic hardware, computer software, or combinations of both. The various illustrative components, blocks, modules and circuits have been described generally in terms of their functionality. Whether the functionality is implemented as hardware or software depends upon the particular application and design constraints imposed on the overall system Skilled artisans recognize the interchangeability of hardware and software under these circumstances, and how best to implement the described functionality for each particular application.

Although exemplary embodiments of the present invention have been described, this should not be construed to limit the scope of the appended claims. Those skilled in the art will understand that modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

PUBLIC NOTICE REGARDING THE SCOPE OF THE INVENTION AND CLAIMS

While the invention has been described in terms of preferred embodiments and generally associated methods, the inventor contemplates that alterations and permutations of the preferred embodiments and methods will become apparent to those skilled in the art upon a reading of the specification and a study of the drawings.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim. In addition, aspects of the invention are particularly pointed out in the claims using terminology that the inventor regards as having its broadest reasonable interpretation; more specific interpretations of 35 U.S.C. section.112 (6) are only intended in those instances where the term "means" is actually recited. The words "comprising," "including," and "having" are intended as open-ended terminology, with the same meaning as if the phrase "at least" were appended after each instance thereof.

The invention claimed is:

1. A system carrying concurrently a LAN signal in a LAN frequency band and a radio frequency signal in a first intermediate frequency band different from and non-interfering with, the LAN frequency band over LAN wiring in a building, the system comprising:
    a first device and a second device connected by the LAN wiring;
    the first device including a high pass filter, connected to the LAN wiring and passing only signals in the first intermediate frequency band to a first signal frequency converter, the first signal frequency converter converting the radio frequency signal in the first intermediate frequency band received from the LAN wiring to a radio frequency band signal for transmission through an antenna to a wireless terminal and converting a radio frequency band signal received though the antenna from the wireless terminal to a first intermediate frequency band signal for transmission over the LAN wiring;
    the first device further including a low pass filter connected to the LAN wiring and passing signals in the LAN frequency band to a first network device connected to the first device; and
    the second device including a high pass filter, connected to the LAN wiring and a network interface adapted to the second device to an external network;
    wherein the high pass filter passes only signals in the first intermediate frequency band between a processor and the LAN wiring and the processor converts the radio frequency signal in the first intermediate frequency band received from the LAN wiring to a network signal and converts a received network signal from the external network to a radio frequency signal in the first intermediate frequency band signal for transmission over the LAN wiring.

2. The system according to claim 1 wherein the LAN wiring carries a second radio frequency signal in a second intermediate frequency band, different from and non-interfering with the LAN frequency band and the first intermediate frequency band;
    wherein the first device includes a second high pass filter, connected to the LAN wiring and passing only signals in the second intermediate frequency band to a third signal frequency converter, the third signal frequency converter converting the radio frequency signal in the second intermediate frequency band received from the LAN wiring to a radio frequency band signal for transmission through an antenna to a wireless terminal and converting a radio frequency band signal received through the antenna from the wireless terminal to a second intermediate frequency band signal for transmission over the LAN wiring; and
    wherein the second device includes a second high pass filter, connected to the LAN wiring and passing only signals in the second intermediate frequency band to a fourth signal frequency converter, the fourth signal frequency converter converting the radio frequency signal in the second intermediate frequency band received from the LAN wiring to the radio frequency band signal for transmission through an antenna and converting a radio frequency band signal received from the antenna to a second intermediate frequency band signal for transmission over the LAN wiring.

3. The system according to claim 1 wherein the first device further includes a Tx/Rx switch connected between the antenna and the first signal frequency converter.

4. The system according to claim 1 wherein the first device further includes a radio frequency filter connected between the antenna and the first signal frequency converter.

5. The system according to claim 1 wherein the second device further includes line interface connected between the high pass filter and the processor.

6. The system according to claim 1 wherein the radio frequency band signal is a cellular telephone signal.

7. The system according to claim 6 wherein the cellular telephone signal is selected from the group including GSM, GPRS, 2.5G, 3G, UMTS, DCS, PCS, CDMA, WCDMA and WiMAX.

8. The system according to claim 1 wherein the radio frequency band signal is a wireless local area networking signal.

9. The system according to claim 1 wherein the radio frequency band signal is a wireless wide area network signal.

10. The system according to claim 1 wherein the LAN wiring carries a power signal and at least one of the first device and the second device is powered by the power signal.

11. The system according to claim 1 wherein the second device further includes a low pass filter connected to the LAN wiring and passing signals in the LAN frequency band to a second network device connected to the second device.

12. The system according to claim 1 wherein the second device further includes a media access control layer processor connected between the network interface and the processor.

13. The system according to claim 1 wherein the second device further includes:
    an RF-IF converter and a second signal frequency converter;
    the RF-IF converter being connected between the second signal frequency converter and the processor for converting the radio frequency signal received from the second signal frequency converter to an intermediate frequency band and converting an intermediate frequency band signal received from the processor to a radio frequency band signal; and the second signal frequency converter connected between the RF-IF converter and the high pass filter for converting the radio frequency signal in the first intermediate frequency band received from the high pass filter to a radio frequency signal and converting a radio frequency signal received from the RF-IF converter to a radio frequency signal in the first intermediate frequency band signal for transmission over the LAN wiring.

14. The system according to claim 13 wherein the second device further includes a Tx/Rx switch connected between the RF-IF converter and the second signal frequency converter.

15. The system according to claim 13 wherein the second device further includes a radio frequency filter connected between the RF-IF converter and the second signal frequency converter.

16. The system according to claim 1 wherein the second device further includes:

a sharing device connecting the processor to the high pass filter and the an antenna; and an RF-IF converter connected between the antenna and the processor for converting the radio frequency signal received from the antenna to an intermediate frequency band and converting an intermediate frequency band signal received from the processor to a radio frequency band signal.

17. The system according to claim 16 wherein the first device further includes line interface connected between the high pass filter and the sharing device.

18. The system according to claim 16 wherein the first device further includes a Tx/Rx switch connected between the antenna and the RF-IF converter.

19. The system according to claim 16 wherein the first device further includes a radio frequency filter connected between the antenna and the RF-IF converter.

20. The system according to claim 1 wherein the second device further includes:

a sharing device connecting the processor to the high pass filter and the an antenna;

an RF-IF converter connected between the sharing device and the processor for converting the radio frequency signal received from the antenna to an intermediate frequency band and converting an intermediate frequency band signal received from the processor to a radio frequency band signal; and second signal frequency converter connected between the sharing device and the high pass filter for converting the radio frequency signal in the first intermediate frequency band received from the high pass filter to a radio frequency signal and converting a radio frequency signal received from the sharing device to a radio frequency signal in the first intermediate frequency band signal for transmission over the LAN wiring.

21. The system according to claim 20 wherein the first device further includes a Tx/Rx switch connected between the antenna and the sharing device.

22. The system according to claim 20 wherein the first device further includes a radio frequency filter connected between the antenna and the sharing device.

* * * * *